United States Patent
Kawai

(10) Patent No.: US 8,243,184 B2
(45) Date of Patent: Aug. 14, 2012

(54) VIBRATING DEVICE AND IMAGE EQUIPMENT HAVING THE SAME

(75) Inventor: Sumio Kawai, Hachioji (JP)

(73) Assignee: Olympus Imaging Corp, Tokyo (JP)

( * ) Notice: Subject to any disclaimer, the term of this patent is extended or adjusted under 35 U.S.C. 154(b) by 245 days.

(21) Appl. No.: 12/815,510

(22) Filed: Jun. 15, 2010

(65) Prior Publication Data

US 2010/0325825 A1 Dec. 30, 2010

(30) Foreign Application Priority Data

Jun. 30, 2009 (JP) .................................. 2009-155909

(51) Int. Cl.
*H04N 5/225* (2006.01)
(52) U.S. Cl. ..................................... 348/335; 348/208.7
(58) Field of Classification Search .................. 348/335, 348/208.1, 208.2, 208.4, 208.7, 208.99, 374, 348/375
See application file for complete search history.

(56) References Cited

U.S. PATENT DOCUMENTS

| | | | |
|---|---|---|---|
| 7,215,372 B2 | 5/2007 | Ito et al. | |
| 7,701,501 B2 * | 4/2010 | Ito et al. | 348/335 |
| 7,946,773 B2 | 5/2011 | Matsumoto | |
| 8,118,500 B2 * | 2/2012 | Kawai | 396/439 |
| 2006/0207290 A1 * | 9/2006 | Ide et al. | 65/27 |

FOREIGN PATENT DOCUMENTS

| | | |
|---|---|---|
| CN | 101266392 A | 9/2008 |
| JP | 2007-267189 A | 10/2007 |

OTHER PUBLICATIONS

Chinese Office Action dated Jul. 26, 2011 (and English translation thereof) in counterpart Chinese Application No. 201010220315.9.

* cited by examiner

*Primary Examiner* — Tuan Ho
*Assistant Examiner* — Kent Wang
(74) *Attorney, Agent, or Firm* — Holtz, Holtz, Goodman & Chick, PC

(57) ABSTRACT

A vibration control unit inputs an electrical signal to a vibrating member to generate, in a light-transmitting region of a dust-screening member, vibration forming a plurality of ridges of peaks defining a closed loop around a virtual intersection at which a virtual vibrational axis passing the half-length point of the vibrating member intersects with a virtual vibrational axis passing the half-length point of the dust-screening member. For example, the vibration is vibration whose peak including the virtual intersection gradually increases in terms of amplitude as the amplitude of the peak approaches the virtual intersection, and becomes the largest in terms of amplitude at the virtual intersection. The dust-screening member and the vibrating member have the following relation: $1.2 \leq Ts/Tg \leq 1.6$, where Tg is the thickness of the dust-screening member, and Ts is the thickness of the vibrating member.

11 Claims, 16 Drawing Sheets

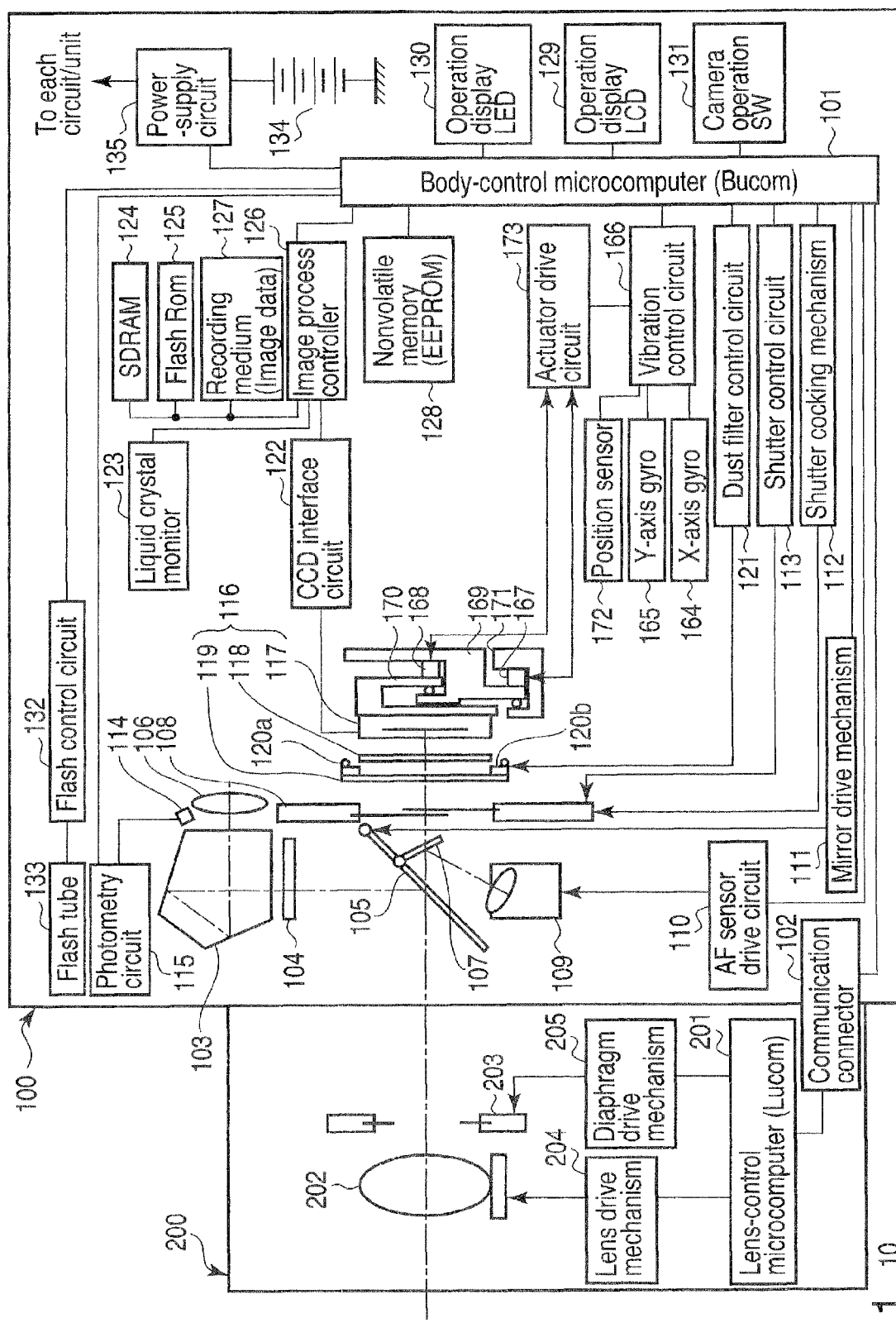
F I G. 1

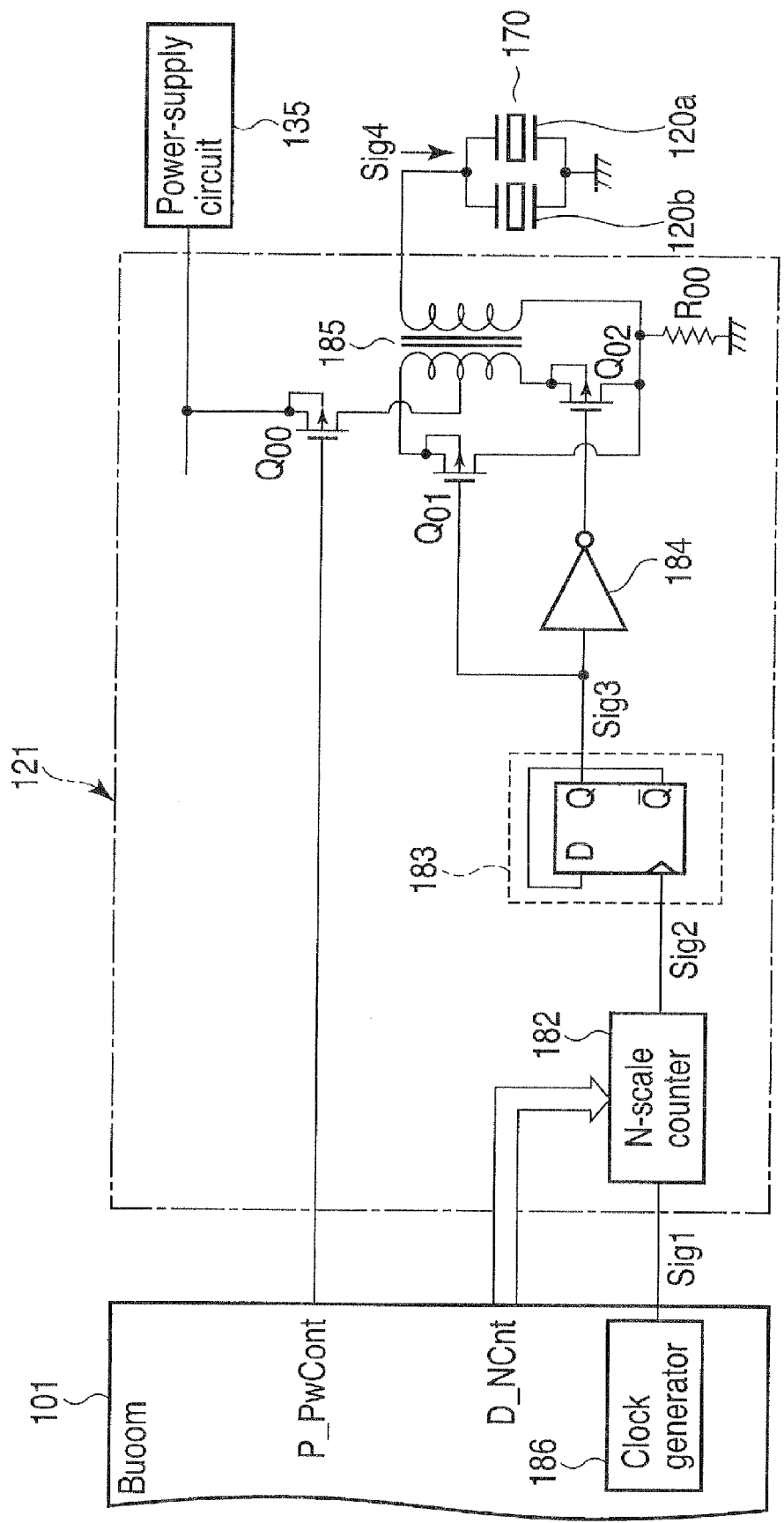
F I G. 12

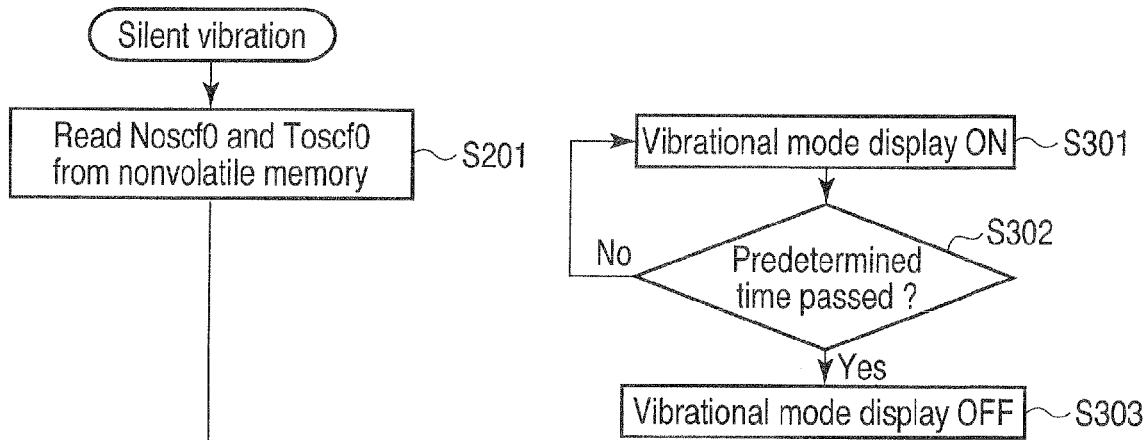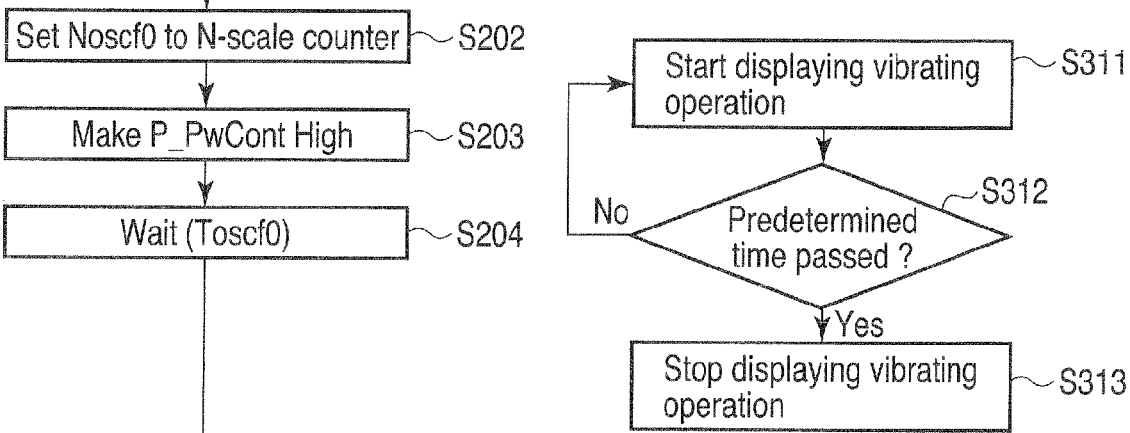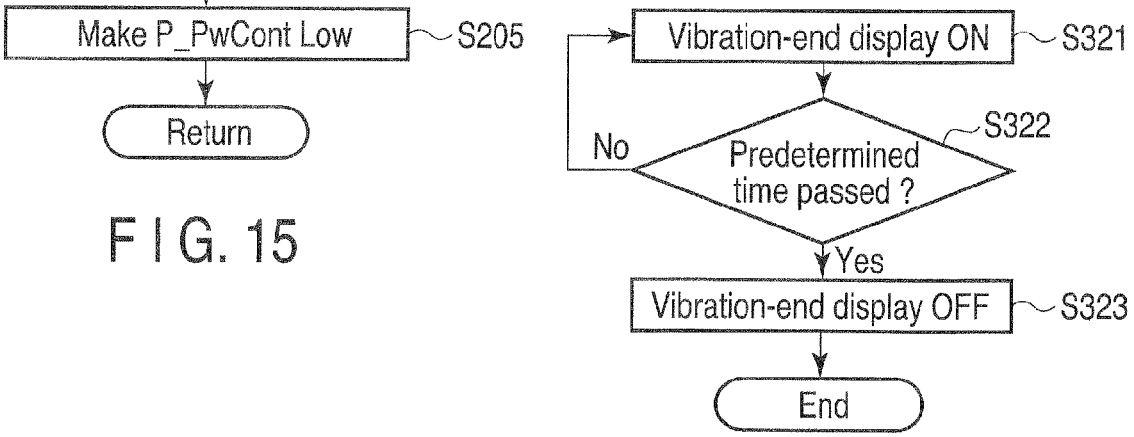
FIG. 15　　FIG. 16　　FIG. 17　　FIG. 18

VIBRATING DEVICE AND IMAGE EQUIPMENT HAVING THE SAME

CROSS-REFERENCE TO RELATED APPLICATIONS

This application is based upon and claims the benefit of priority from prior Japanese Patent Application No. 2009-155909, filed Jun. 30, 2009, the entire contents of which are incorporated herein by reference.

BACKGROUND OF THE INVENTION

1. Field of the Invention

The present invention relates to image equipment having image forming elements such as an image sensor element or a display element, and also to a vibrating device designed to vibrate the dust-screening member that is arranged at the front of each image forming element of such an image equipment.

2. Description of the Related Art

As image equipment having image forming elements, there is known an image acquisition apparatus that has an image sensor element configured to produce a video signal corresponding to the light applied to its photoelectric conversion surface. Also known is an image projector that has a display element, such as liquid crystal element, which displays an image on a screen. In recent years, image equipment having such image forming elements have been remarkably improved in terms of image quality. If dust adheres to the surface of the image forming element such as the image sensor element or display element or to the surface of the transparent member (optical element) that is positioned in front of the image forming element, the image produced will have shadows of the dust particles. This makes a great problem.

For example, digital cameras of called "lens-exchangeable type" have been put to practical use, each comprising a camera body and a photographic optical system removably attached to the camera body. The lens-exchangeable digital camera is so designed that the user can use various kinds of photographic optical systems, by removing the photographic optical system from the camera body and then attaching any other desirable photographic optical system to the camera body. When the photographic optical system is removed from the camera body, the dust floating in the environment of the camera flows into the camera body, possibly adhering to the surface of the image sensor element or to the surface of the transparent member (optical element), such as a lens, cover glass or the like, that is positioned in front of the image sensor element. The camera body contains various mechanisms, such as a shutter and a diaphragm mechanism. As these mechanisms operate, they produce dust, which may adhere to the surface of the image sensor element as well.

Projectors have been put to practical use, too, each configured to enlarge an image displayed by a display element (e.g., CRT or liquid crystal element) and project the image onto a screen so that the enlarged image may be viewed. In such a projector, too, dust may adhere to the surface of the display element or to the surface of the transparent member (optical element), such as a lens, cover glass or the like, that is positioned in front of the display element, and enlarged shadows of the dust particles may inevitably be projected to the screen. In such a projector, dust may likely enter the main unit of the projector from a position near the mechanism of the cooling fan.

Various types of mechanisms that remove dust from the surface of the image forming element or the transparent member (optical element) that is positioned in front of the image sensor element, provided in such image equipment have been developed.

In an electronic image acquisition apparatus disclosed in, for example, U.S. Pat. No. 7,215,372, a ring-shaped piezoelectric element (vibrating member) is secured to the circumferential edge of a glass plat shaped like a disc (dust-screening member). When a voltage of a prescribed frequency is applied to the piezoelectric element, the glass plat shaped like a disc undergoes a standing-wave, bending vibration having nodes at the concentric circles around the center of the glass plat shaped like a disc. This vibration removes the dust from the glass disc. The vibration (vibrational mode 1) produced by the voltage of the prescribed frequency is a standing wave having nodes at the concentric circles around the center of the disc. The dust particles at these nodes cannot be removed, because the amplitude of vibration at the nodes is small. In view of this, the glass plat shaped like a disc is vibrated at a different frequency, achieving a standing-wave vibration (vibrational mode 2) that has nodes at concentric circles different from those at which the nodes of vibrational mode 1 are located. Thus, those parts of the glass disc, where the nodes lie in vibrational mode 1, are vibrated at large amplitude.

Jpn. Pat. Appln. KOKAI Publication No. 2007-267189 discloses a rectangular dust-screening member and piezoelectric elements secured to the opposite sides of the dust-screening member, respectively. The piezoelectric elements produce vibration at a predetermined frequency, resonating the dust-screening member. Vibration is thereby achieved in such mode that nodes extend parallel to the sides of the dust-screening member. Further, as in the mechanism of U.S. Pat. No. 7,215,372, the dust-screening member is made to resonate at a different frequency, accomplishing a standing-wave vibrational mode, in order to change the opposition of nodes. Any one of these vibrational modes achieves bending vibration having nodes extending parallel to the sides of the dust-screening member.

BRIEF SUMMARY OF THE INVENTION

According to a first aspect of the present invention, there is provided a vibrating device comprising:

a dust-screening member shaped like a plate as a whole, having front and back surfaces and having a light-transmitting region for transmitting light between the front surface and the back surface;

a support member configured to support the dust-screening member, thereby to render the back surface of the dust-screening member airtight;

a vibrating member arranged at a circumference of the dust-screening member and shaped like a rectangle; and a vibration control unit configured to input an electrical signal to the vibrating member to generate, in the light-transmitting region, vibration forming a plurality of ridges of peaks defining a closed loop around a virtual intersection at which a virtual vibrational axis passing the half-length point of the vibrating member intersects with a virtual vibrational axis passing the half-length point of the dust-screening member, the vibration being one of vibration whose peak including the virtual intersection gradually increases in terms of amplitude as the amplitude of the peak approaches the virtual intersection, and becomes the largest in terms of amplitude at the virtual intersection, and vibration whose peak nearest the virtual intersection is the largest in terms of amplitude, wherein the dust-screening member and the vibrating member have the following relation:

$$1.2 \leq Ts/Tg \leq 1.6$$

where Tg is the thickness of the thickness of the dust-screening member, and Ts is the thickness of the vibrating member.

According to a second aspect of the present invention, there is provided an image equipment comprising:

a dust-screening member shaped like a plate as a whole, having front and back surfaces and having a light-transmitting region for transmitting light between the front surface and the back surface;

a support member configured to support the dust-screening member, thereby to render the back surface of the dust-screening member airtight;

a vibrating member arranged at a circumference of the dust-screening member and shaped like a rectangle;

an image sensor element having a photoelectric conversion unit configured to convert, a light beam coming from an object of photograph through a photographic optical system, to an image signal, and being supported by the support member and rendered airtight at the back of the dust-screening member; and a vibration control unit configured to input an electrical signal to the vibrating member to generate, in the light-transmitting region, vibration forming a plurality of ridges of peaks defining a closed loop around a virtual intersection at which a virtual vibrational axis passing the half-length point of the vibrating member intersects with a virtual vibrational axis passing the half-length point of the dust-screening member, the vibration being one of vibration whose peak including the virtual intersection gradually increases in terms of amplitude as the amplitude of the peak approaches the virtual intersection, and becomes the largest in terms of amplitude at the virtual intersection, and vibration whose peak nearest the virtual intersection is the largest in terms of amplitude, wherein the dust-screening member and the vibrating member have the following relation:

$$1.2 \leq Ts/Tg \leq 1.6$$

where Tg is the thickness of the thickness of the dust-screening member, and Ts is the thickness of the vibrating member.

According to a third aspect of the present invention, there is provided a vibrating device comprising:

a dust-screening member shaped like a plate as a whole, having front and back surfaces and having light-transmitting region for transmitting light between the front surface and the back surface;

a support member configured to support the dust-screening member, thereby to render the back surface of the dust-screening member airtight;

a set of vibrating members arranged at a circumference of the dust-screening member and opposed to one another across the light-transmitting region of the dust-screening member and being shaped like a rectangle; and a vibration control unit configured to input an electrical signal to the vibrating members to generate, in the light-transmitting region, vibration forming a plurality of ridges of peaks defining a closed loop around a virtual intersection at which a virtual symmetry axis passing points at the same distance from the vibrating members intersects with virtual vibrational axes of the vibrating members, the vibration being vibration whose peak including the virtual intersection gradually increases in terms of amplitude as the amplitude of the peak approaches the virtual intersection, and becomes the largest in terms of amplitude at the virtual intersection, wherein the dust-screening member and the vibrating member have the following relation:

$$1.2 \leq Ts/Tg \leq 1.6$$

where Tg is the thickness of the thickness of the dust-screening member, and Ts is the thickness of the vibrating member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing an exemplary system configuration, mainly electrical, of a lens-exchangeable, single-lens reflex electronic camera (digital camera) that is a first embodiment of the image equipment according to this invention;

FIG. 12 is a circuit diagram schematically showing the configuration of a dust filter control circuit;

FIG. 15 is a flowchart showing the operating sequence of "silent vibration" that is a subroutine shown in FIG. 14A;

FIG. 16 is a flowchart showing the operation sequence of the "display process" performed at the same time Step S201 of "silent vibration," i.e. subroutine (FIG. 15), is performed;

FIG. 17 is a flowchart showing the operating sequence of the "display process" performed at the same time Step S203 of "silent vibration," i.e., or subroutine (FIG. 15), is performed;

FIG. 18 is a flowchart showing the operating sequence of the "display process" performed at the same time Step S205 of "silent vibration," i.e., subroutine (FIG. 15), is performed;

DETAILED DESCRIPTION OF THE INVENTION

Figure 2A:
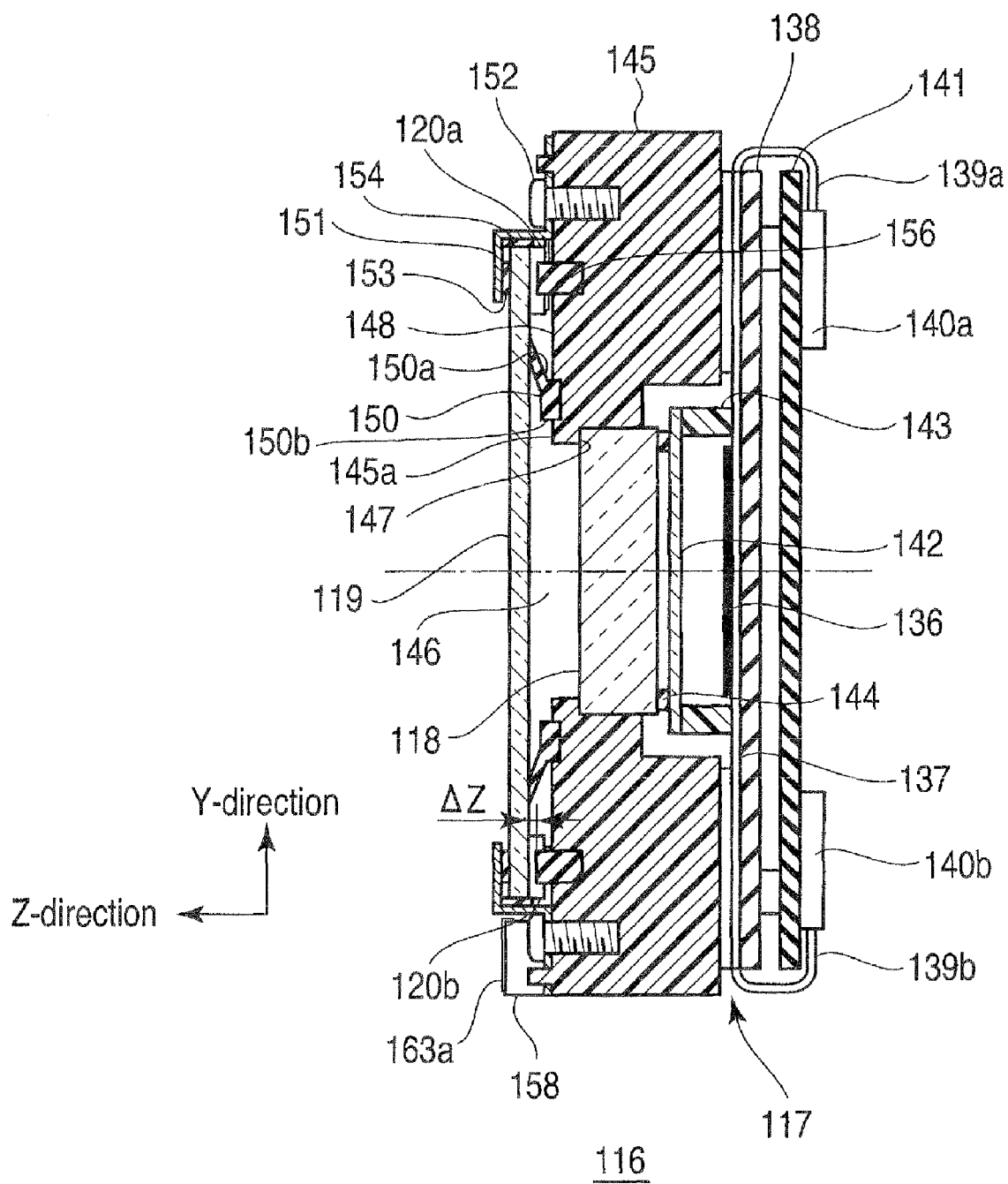
FIG. 2A is a vertical side view of an image sensor element unit of the digital camera, which includes a dust removal mechanism (or a sectional view taken along line A-A shown in FIG. 2B)

Best modes of practicing this invention will be described with reference to the accompanying drawings.

First Embodiment

An image equipment according to this invention, which will be exemplified below in detail, has a dust removal mechanism for the image sensor element unit that performs photoelectric conversion to produce an image signal. Here, a technique of improving the dust removal function of, for example, an electronic camera (hereinafter called "camera" will be explained. The first embodiment will be described, particularly in connection with a lens-exchangeable, single-lens reflex electronic camera (digital camera), with reference to FIGS. 1 to 2B.

First, the system configuration of a digital camera 10 according to this embodiment will be described with reference to FIG. 1. The digital camera 10 has a system configuration that comprises body unit 100 used as camera body, and a lens unit 200 used as an exchange lens, i.e., one of accessory devices.

The lens unit 200 can be attached to and detached from the body unit 100 via a lens mount (not shown) provided on the front of the body unit 100. The control of the lens unit 200 is performed by the lens-control microcomputer (hereinafter called "Lucom") 201 provided in the lens unit 200. The control of the body unit 100 is performed by the body-control microcomputer (hereinafter called "Bucom" 101 provided in the body unit 100. By a communication connector 102, the Lucom 210 and the Bucom 101 are electrically connected to each other, communicating with each other, while the lens unit 200 remains attached to the body unit 100. The Lucom 201 is configured to cooperate, as subordinate unit, with the Bucom 101.

The lens unit 200 further has a photographic lens 202, a diaphragm 203, a lens drive mechanism 204, and a diaphragm drive mechanism 205. The photographic lens 202 is driven by a DC motor (not shown) that is provided in the lens drive mechanism 204. The diaphragm 203 is driven by a stepping motor (not shown) that is provided in the diaphragm drive mechanism 205. The Lucom 201 controls these motors in accordance with the instructions made by the Bucom 101.

In the body unit 100, a penta-prism 103, a screen 104, a quick return mirror 105, an ocular lens 106, a sub-mirror 107, a shutter 108, an AF sensor unit 109, an AF sensor drive circuit 110, a mirror drive mechanism 111, a shutter cocking mechanism 112, a shutter control circuit 113, a photometry sensor 114, and a photometry circuit 115 are arranged as shown in FIG. 1. The penta-prism 103, the screen 104, the quick return mirror 105, the ocular lens 106, and the sub-mirror 107 are single-lens reflex components that constitute an optical system. The shutter 108 is a focal plane shutter arranged on the photographic optical axis. The AF sensor unit 109 receives a light beam reflected by the sub-mirror 107 and detects the degree of defocusing.

The AF sensor drive circuit 110 controls and drives the AF sensor unit 109. The mirror drive mechanism 111 controls and drives the quick return mirror 105. The shutter cocking mechanism 112 biases the spring (not shown) that drives the front curtain and rear curtain of the shutter 108. The shutter control circuit 113 controls the motions of the front curtain and rear curtain of the shutter 108. The photometry sensor 114 detects the light beam coming from the penta-prism 103. The photometry circuit 115 performs a photometry process on the basis of the light beam detected by the photometry sensor 114.

In the body unit 100, an image acquisition unit 116 is further provided to perform photoelectric conversion on the image of an object, which has passed through the above-mentioned optical system. The image acquisition unit 116 is a unit composed of a CCD 117 that is an image sensor element as an image forming element, an optical low-pass filter (LPF) 118 that is arranged in front of the CCD 117, and a dust filter 119 that is a dust-screening member. Thus, in this embodiment, a transparent glass plate (optical element) that has, at least at its transparent part, a refractive index different from that of air is used as the dust filter 119. Nonetheless, the dust filter 119 is not limited to a glass plate (optical element). Any other member (optical element) that exists in the optical path and can transmit light may be used instead. For example, the transparent glass plate (optical element) may be replaced by an optical low-pass filter (LPF), an infrared-beam filter, a deflection filter, a half mirror, or the like. In this case, the frequency and drive time pertaining to vibration and the position of a vibration member (later described) are set in accordance with the member (optical element). The CCD 117 is used as an image sensor element. Nonetheless, any other image sensor element, such as CMOS or the like, may be used instead.

As mentioned above, the dust filter 119 can be selected from various devices including an optical low-pass filter (LPF). However, this embodiment will be described on the assumption that the dust filter is a glass plate (optical element).

To the circumferential edge of the dust filter 119, two piezoelectric elements 120a and 120b are attached. The piezoelectric elements 120a and 120b have two electrodes each. A dust filter control circuit 121, which is a vibration control unit, drives the piezoelectric elements 120a and 120b at the frequency determined by the size and material of the dust filter 119. As the piezoelectric elements 120a and 120b vibrate, the dust filter 119 undergoes specific vibration. Dust can thereby be removed from the surface of the dust filter 119. To the image acquisition unit 116, an anti-vibration unit is attached to compensate for the motion of the hand holding the digital camera 10.

The digital camera 10 according to this embodiment further has a CCD interface circuit 122, a liquid crystal monitor 123, an SDRAM 124, a Flash ROM 125, and an image process controller 126, thereby to perform not only an electronic image acquisition function, but also an electronic record/display function. The CCD interface circuit 122 is connected to the CCD 117. The SDRAM 124 and the Flash ROM 125 function as storage areas. The image process controller 126 uses the SDRAM 124 and the Flash ROM 125, to process image data. A recording medium 127 is removably connected by a communication connector (not shown) to the body unit 100 and can therefore communicate with the body unit 100. The recording medium 127 is an external recording medium, such as one of various memory cards or an external HDD, and records the image data acquired by photography. As another storage area, a nonvolatile memory 128, e.g., EEPROM, is provided and can be accessed from the Bucom 101. The nonvolatile memory 128 stores prescribed control parameters that are necessary for the camera control.

To the Bucom 101, there are connected an operation display LCD 129, an operation display LED 130, a camera operation switch 131, and a flash control circuit 132. The operation display LCD 129 and the operation display LED 130 display the operation state of the digital camera 10, informing the user of this operation state. The operation display LED 129 or the operation display LED 130 has, for example, a display unit configured to display the vibration state of the dust filter 119 as long as the dust filter control circuit 121 keeps operating. The camera operation switch 131 is a group of switches including, for example, a release switch, a mode changing switch, a power switch, which are necessary for the user to operate the digital camera 10. The flash control circuit 132 drives a flash tube 133.

In the body unit 100, a battery 134 used as power supply and a power-supply circuit 135 are further provided. The power-supply circuit 135 converts the voltage of the battery 134 to a voltage required in each circuit unit of the digital camera 10 and supplies the converted voltage to the each circuit unit. In the body unit 100, too, a voltage detecting circuit (not shown) is provided, which detects a voltage change at the time when a current is supplied from an external power supply though a jack (not shown).

The components of the digital camera 10 configured as described above operate as will be explained below. The image process controller 126 controls the CCD interface circuit 122 in accordance with the instructions coming from the Bucom 101, whereby image data is acquired from the CCD 117. The image data is converted to a video signal by the image process controller 126. The image represented by the video signal is displayed by the liquid crystal monitor 123. Viewing the image displayed on the liquid crystal monitor 123, the user can confirm the image photographed.

The SDRAM 124 is a memory for temporarily store the image data and is used as a work area in the process of converting the image data. The image data is held in the recording medium 127, for example, after it has been converted to JPEG data.

The mirror drive mechanism 111 is a mechanism that drives the quick return mirror 105 between an up position and a down position. While the quick return mirror 105 stays at the down position, the light beam coming from the photographic lens 202 is split into two beams. One beam is guide to the AF sensor unit 109, and the other beam is guided to the penta-prism 103. The output from the AF sensor provided in the AF sensor unit 109 is transmitted via the AF sensor drive circuit 110 to the Bucom 101. The Bucom 101 performs the distance measuring of the known type. In the meantime, a part of the light beam, which has passed through the penta-prism 103, is guided to the photometry sensor 114 that is connected to the photometry circuit 115. The photometry circuit 115 performs photometry of the known type, on the basis of the amount of light detected by the photometry sensor 114.

The image acquisition unit 116 that includes the CCD 117 will be described with reference to FIGS. 2A and 2B. Note that the hatched parts shown in FIG. 2B show the shapes of members clearly, not to illustrating the sections thereof.

As described above, the image acquisition unit 116 has the CCD 117, the optical LPF 118, the dust filter 119, and the piezoelectric elements 120a and 120b. The CCD 117 is an image sensor element that produces an image signal that corresponds to the light applied to its photoelectric conversion surface through the photographic optical system. The optical LPF 118 is arranged at the photoelectric conversion surface of the CCD 117 and removes high-frequency components from the light beam coming from the object through the photographic optical system. The dust filter 119 is a dust-screening member arranged in front of the optical LPF 118 and facing the optical LPF 118, spaced apart therefrom by a predetermined distance. The piezoelectric elements 120a and 120b are arranged on the circumferential edge of the dust filter 119 and are vibrating members for applying specific vibration to the dust filter 119.

The CCD chip 136 of the CCD 117 is mounted directly on a flexible substrate 137 that is arranged on a fixed plate 138. From the ends of the flexible substrate 137, connection parts 139a and 139b extend. Connectors 140a and 140b are provided on a main circuit board 141. The connection parts 139a and 139b are connected to the connectors 140a and 140h, whereby the flexible substrate 137 is connected to the main circuit board 141. The CCD 117 has a protection glass plate 142. The protection glass plate 142 is secured to the flexible substrate 137, with a spacer 143 interposed between it and the flexible substrate 137.

Between the CCD 117 and the optical LPF 118, a filter holding member 144 made of elastic material is arranged on the front circumferential edge of the CCD 117, at a position where it does not cover the effective area of the photoelectric conversion surface of the CCD 117. The filter holding member 144 abuts on the optical LPF 118, at a part close to the rear circumferential edge of the optical LPF 118. The filter holding member 144 functions as a sealing member that maintains the junction between the CCD 117 and the optical LPF 118 almost airtight. A holder 145 is provided, covering seals the CCD 117 and the optical LPF 118 in airtight fashion. The holder 145 has a rectangular opening 146 in a part that is substantially central around the photographic optical axis. The inner circumferential edge of the opening 146, which faces the dust filter 119, has a stepped part 147 having an L-shaped cross section. Into the opening 146, the optical LPF 118 and the CCD 117 are fitted from the back. In this case, the front circumferential edge of the optical LPF 118 contacts the stepped part 147 in a virtually airtight fashion. Thus, the optical LPF 118 is held by the stepped part 147 at a specific position in the direction of the photographic optical axis. The optical LPF 118 is therefore prevented from slipping forwards from the holder 145. The level of airtight sealing between the CCD 117 and the optical LPF 118 is sufficient to prevent dust from entering to form an image having shadows of dust particles. In other words, the sealing level need not be so high as to completely prevent the in-flow of gasses.

On the front circumferential edge of the holder 145, a dust-filter holding unit 148 is provided, covering the entire front circumferential edge of the holder 145. The dust-filter holding unit 148 is formed, surrounding the stepped part 147 and projecting forwards from the stepped part 147, in order to hold the dust filter 119 in front of the LPF 118 and to space the filter 119 from the stepped part 147 by a predetermined distance. The opening of the dust-filter holding unit 148 serves as focusing-beam passing area 149. The dust filter 119 is shaped like a polygonal plate as a whole (a square plate, in this embodiment). The dust filter 119 is supported on a seal 150 (a support member), pushed onto the seal 150 by a pushing member 151 which is constituted by an elastic body such as a leaf spring and has one end fastened with screws 152 to the dust-filter holding unit 148. More specifically, a cushion member 153 made of vibration attenuating material, such as rubber or resin, and adhered to the pushing member 151, is interposed between the pushing member 151 and the dust filter 119. On the other hand, at the back of the dust filter 119, the seal 150 having an ring-shaped lip part 150a surrounding the center of the dust filter 119 is interposed between the circumferential part of the dust filter 119 and the dust-filter holding unit 148. The pushing member 151 exerts a pushing force, which bends the lip part 150a. The lip part 150a pushes the dust filter 119. As a result, the space including the opening 146 is sealed airtight and the dust filter 119 is supported. Thus, the seal 150 used as support member supports the dust filter 119 so that the dust filter 119 used as dust-screening member may be rendered airtight at the back.

The dust filter 119 is positioned with respect to the Y-direction in the plane that is perpendicular to the optical axis, as that part of the pushing member 151 which is bent in the Z-direction, receive a force through a positioning member 154. On the other hand, the dust filter 119 is positioned with respect to the X-direction in the plane that is perpendicular to the optical axis, as a support part 155 provided on the holder 145 receive a force through the positioning member 154, as is illustrated in FIG. 2B. The positioning member 154 is made of vibration-attenuating material such as rubber or resin, too, not to impede the vibration of the dust filter 119. The main body 150b of the seal 150 is pressed onto the outer circumferential edge of a ring-shaped projection 145a fitted at the rim of the opening 146 of the holder 145, and is thereby set in place.

When the dust filter 119 receives gravitational acceleration G and an external force (such as an inertial force) as the camera is moved, the external force is applied to the pushing member 151 or the seal 150. The pushing member 151 is a plate made of phosphor bronze or stainless steel, either for use as material of springs, and has high flexural rigidity. By contrast, the seal 150 is made of rubber and has small flexural rigidity. Thus, the seal 150 is deformed due to the external force.

Cushion members 156 made of vibration attenuating material, such as rubber or soft resin, are provided on that surface of the dust-filter holding unit 148, which faces the back of the dust filter 119. At least two cushion members 156 (four cushion members in this embodiment) are positioned, almost symmetric with respect to the optical axis, and are spaced by distance $\Delta Z$ from the dust filter 119 in the direction of the optical axis. When the seal 150 is deformed by the distance $\Delta Z$, the dust filter 119 contacts the cushion member 156. As a result, the external force tends to compress the cushion member 156 (at four parts). However, the cushion member 156 is scarcely deformed despite the external force, because its compression rigidity is higher than the flexural rigidity of the seal 150. Therefore, the seal 150 is deformed, but very little. Note that the cushion member 156 is arranged, supporting the dust filter 119 at the nodes where the dust filter 119 scarcely undergoes vibration even if the dust filter 119 is pushed by the cushion member 156. Since the cushion member 156 is arranged so, the vibration of the dust filter 119 is not much impeded. This helps to provide a dust-screening mechanism having that generate vibration at large amplitude and hence can remove dust at high efficiency. Moreover, the deformation of the seal 150, caused by the external force, is as small as $\Delta Z$ (for example, 0.1 to 0.2 mm). Hence, an excessively large force will not applied to the seal 150 to twist the seal 150, failing to maintain the airtight state, or the seal 150 will not contact the dust filter 119 with an excessive pressure when the external force is released from it.

The seal 150 may of course have its main body 150b secured to the holder 145 by means of, for example, adhesion. If the seal 150 is made of soft material such as rubber, it may be secured to the dust filter 119. In this case, the seal 150 only needs to apply a pressing force large enough to support the vibrator configured by the dust filter 119 and the piezoelectric elements 120a and 120b.

If the vibrator has a mass W (kg) and if the gravitational acceleration is 1 G, the vibrator will receive a force of 1 G*W (N) because of its own weight. Assume that acceleration of 1 G is also exerted on the vibrator while the camera is being used in normal state. Then, the total force of 2 WG (N) is exerted on the vibrator. To support the vibrator in this condition, the pushing force F (N) must be equal to or greater than 2 WG ($\geq$2 WG).

In order to hold the vibrator, however, the pushing force F(N) must be about ten times the acceleration of 2 G (i.e., 2 G*10=20 G), including a margin, or at least 20 G*W (that is, F(N)$\geq$20 G*W).

The equipment according to this embodiment, such as a digital camera, incorporates a vibrator having a mass of about 1 to 10 grams. Hence, 0.198$\leq$F (N)$\leq$1.96, or preferably 0.2$\leq$F (N)$\leq$2, including a margin. Therefore, the pushing force is sufficient if it is equal to or less than 2 (N).

Note that the piezoelectric element used in this embodiment has a mass of 1.5 grams. Hence, the pushing force is about 0.3 (N).

Therefore, as will be described later, the pressure never impede the vibration generated in the dust filter 119, and the dust filter 119 can remove dust at a very high efficiency.

The pushing force may be applied at only one position, not a plurality of positions as in this embodiment, if the light applied toward the image sensor is not blocked. In the configuration of FIG. 2B, for example, the force may be applied to the piezoelectric element 120a only or to the piezoelectric element 120b only.

If piezoelectric elements are arranged at a plurality of positions, then the piezoelectric element 120a may so arranged as shown in, for example, FIG. 25, whereas the piezoelectric element 120b may be arranged, extending perpendicular to the piezoelectric element 120a (but not blocking the light applied toward the image sensor).

Further, piezoelectric elements may be arranged to form a rectangular frame, in a region where they do not block the light applied toward the image sensor.

Moreover, as shown in FIG. 25, the lip part 150a of the seal 150 is shaped like a ring, arced at the four corners and having no inflection points. So shaped, the lip part 150a is not locally deformed when it receives an external force.

The image acquisition unit 116 is thus configured as an airtight structure that has the holder 145 having a desired size and holding the CCD 117. The level of airtight sealing between the dust filter 119 and the dust-filter holding unit 148 is sufficient to prevent dust from entering to form an image having shadows of dust particles. The sealing level need not be so high as to completely prevent, the in-flow of gasses.

To the ends of the piezoelectric elements 120a and 120b, which are vibrating members, flexes 157a and 157b, i.e., flexible printed boards, are electrically connected. The flexes 157e and 157b input an electric signal (later described) from the dust filter control circuit 121 to the piezoelectric elements 120a and 120b, causing the elements 120a and 120b to vibrate in a specific way. The flexes 157a and 157b are made of resin and cupper etc., and have flexibility. Therefore, they little attenuate the vibration of the piezoelectric elements 120a and 120b. The flexes 157a and 157b are provided at positions where the vibrational amplitude is small (at the nodes of vibration, which will be described later), and can therefore suppress the attenuation of vibration. The piezoelectric elements 120a and 120b move relative to the body unit 100 if the camera 10 has such a hand-motion compensating mechanism as will be later described. Hence, if the dust filter control circuit 121 is held by a holding member formed integral with the body unit 100, the flexes 157a and 157b are deformed and displaced as the hand-motion compensating mechanism operates. In this case, the flexes 157a and 157b effectively work because they are thin and flexible. In the present embodiment, the flexes 157a and 157b have a simple configuration, extending from two positions. They are best fit for use in cameras having a hand-motion compensating mechanism.

The dust removed from the surface of the dust filter 119 falls onto the bottom of the body unit 100, by virtue of the vibration inertia and the gravity. In this embodiment, a base 158 arranged right below the dust filter 119, and holding members 159a and 159b made of, for example, adhesive tape, is provided on the base 158. The holding members 159a and 159b reliably trap the dust fallen from the dust filter 119, preventing the dust from moving back to the surface of the dust filter 119.

The hand-motion compensating mechanism will be explained in brief. As shown in FIG. 1, the hand-motion compensating mechanism is composed of an X-axis gyro 160, a Y-axis gyro 161, a vibration control circuit 162, an X-axis actuator 163, a Y-axis actuator 164, an X-frame 165, a Y-frame 166 (holder 145), a frame 167, a position sensor 168, and an actuator drive circuit 169. The X-axis gyro 160 detects the angular velocity of the camera when the camera moves, rotating around the X axis. The Y-axis gyro 161 detects the angular velocity of the camera when the camera rotates around the Y axis. The vibration control circuit 162 calculates a value by which to compensate the hand motion, from the angular-velocity signals output from the X-axis gyro 160 and Y-axis gyro 161. In accordance with the hand-motion compensating value thus calculated, the actuator drive circuit 169 moves the CCD 117 in the X-axis direction and Y-axis direction, which are first and second directions orthogonal to each other in the XY plane that is perpendicular to the photographic optical axis, thereby to compensate the hand motion, if the photographic optical axis is taken as Z axis. More precisely, the X-axis actuator 163 drives the X-frame 165 in the X-axis direction upon receiving a drive signal from the actuator drive circuit 169, and the Y-axis actuator 164 drives the Y-frame 166 in the Y-axis direction upon receiving a drive signal from the actuator drive circuit 169. That is, the X-axis actuator 163 and the Y-axis actuator 164 are used as drive sources, the X-frame 165 and the Y-frame 166 (holder 145) which holds the CCD 117 of the image acquisition unit 116 are used as objects that are moved with respect to the frame 167. Note that the X-axis actuator 163 and the Y-axis actuator 164 are each composed of an electromagnetic motor, a feed screw mechanism, and the like. Alternatively, each actuator may be a linear motor using a voice coil motor, a linear piezoelectric motor or the like. The position sensor 168 detects the position of the X-frame 165 and the position of the Y-frame 166. On the basis of the positions the position sensor 168 have detected, the vibration control circuit 162 controls the actuator drive circuit 169, which drives the X-axis actuator 163 and the Y-axis actuator 164. The position of the CCD 117 is thereby controlled.

The dust removal mechanism of the first embodiment will be described in detail, with reference to FIGS. 2B to 11. The dust filter 119 has at least one side symmetric with respect to a certain symmetry axis, and is a glass plate (optical element) of a polygonal plate as a whole (a square plate, in this embodiment). The dust filter 119 has a region flaring in the radial direction from the position at which maximum vibrational amplitude is produced. This region forms a transparent part. Alternatively, the dust filter 119 may be D-shaped, formed by cutting a part of a circular plate, thus defining one side. Still alternatively, it may formed by cutting a square plate, having two opposite sides accurately cut and having upper and lower sides. The above-mentioned fastening mechanism fastens the dust filter 119, with the transparent part opposed to the front of the LPF 118 and spaced from the LPF 118 by a predetermined distance. To one surface of the dust filter 119 (i.e., back of the filter 119, in this embodiment), the piezoelectric elements 120a and 120b, which are vibrating members, are secured at the upper and lower edges of the filter 119, by means of adhesion using adhesive. The piezoelectric elements 120a and 120b, which are arranged on the dust filter 119, constitute a vibrator 170. The vibrator 170 undergoes resonance when a voltage of a prescribed frequency is applied to the piezoelectric elements 120a and 120b. The resonance achieves such bending vibration of a large amplitude.

Figure 2B:
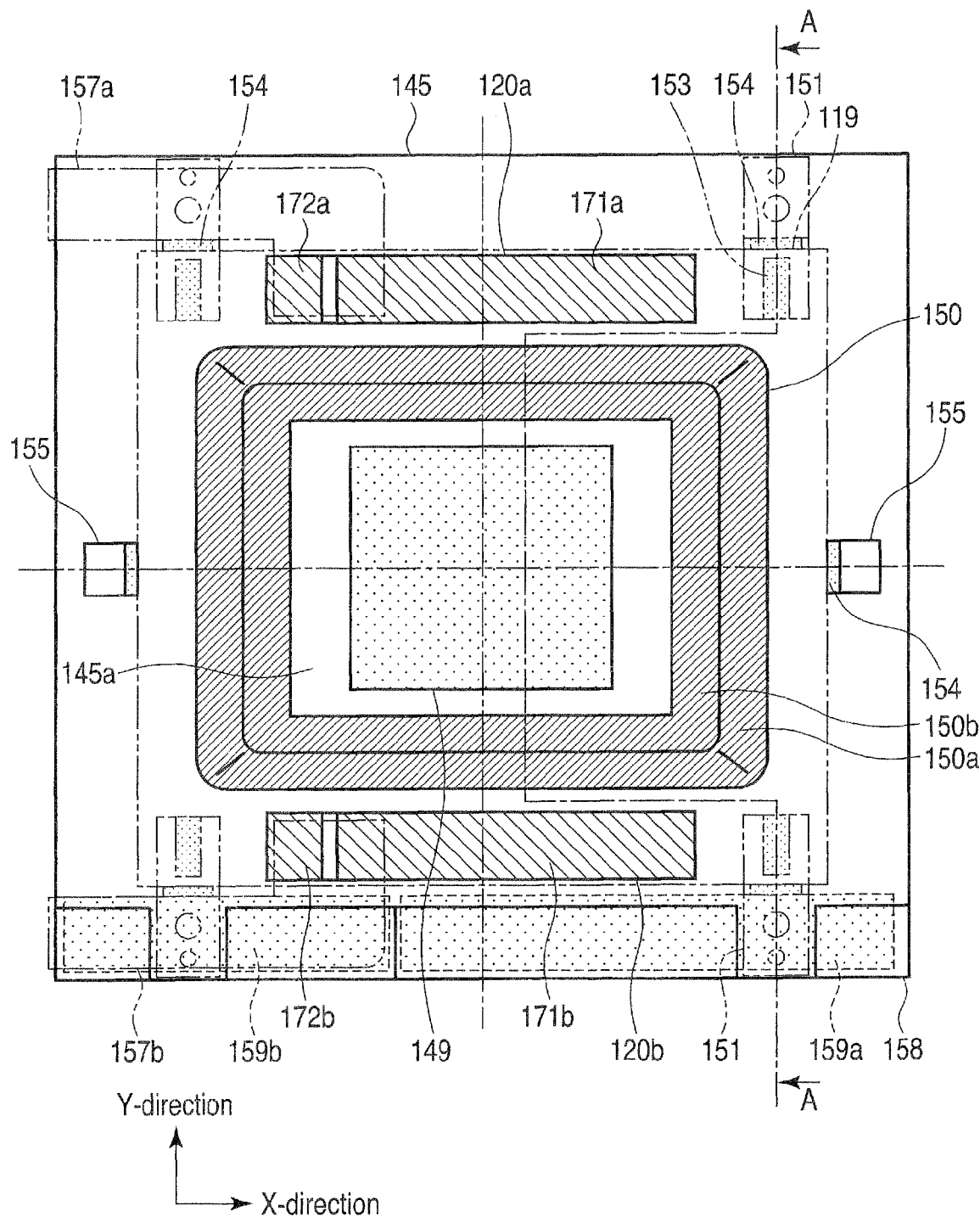
FIG. 2B is a front view of the dust removal mechanism, viewed from the lens side.
Figures 3A, 3B, 3C:
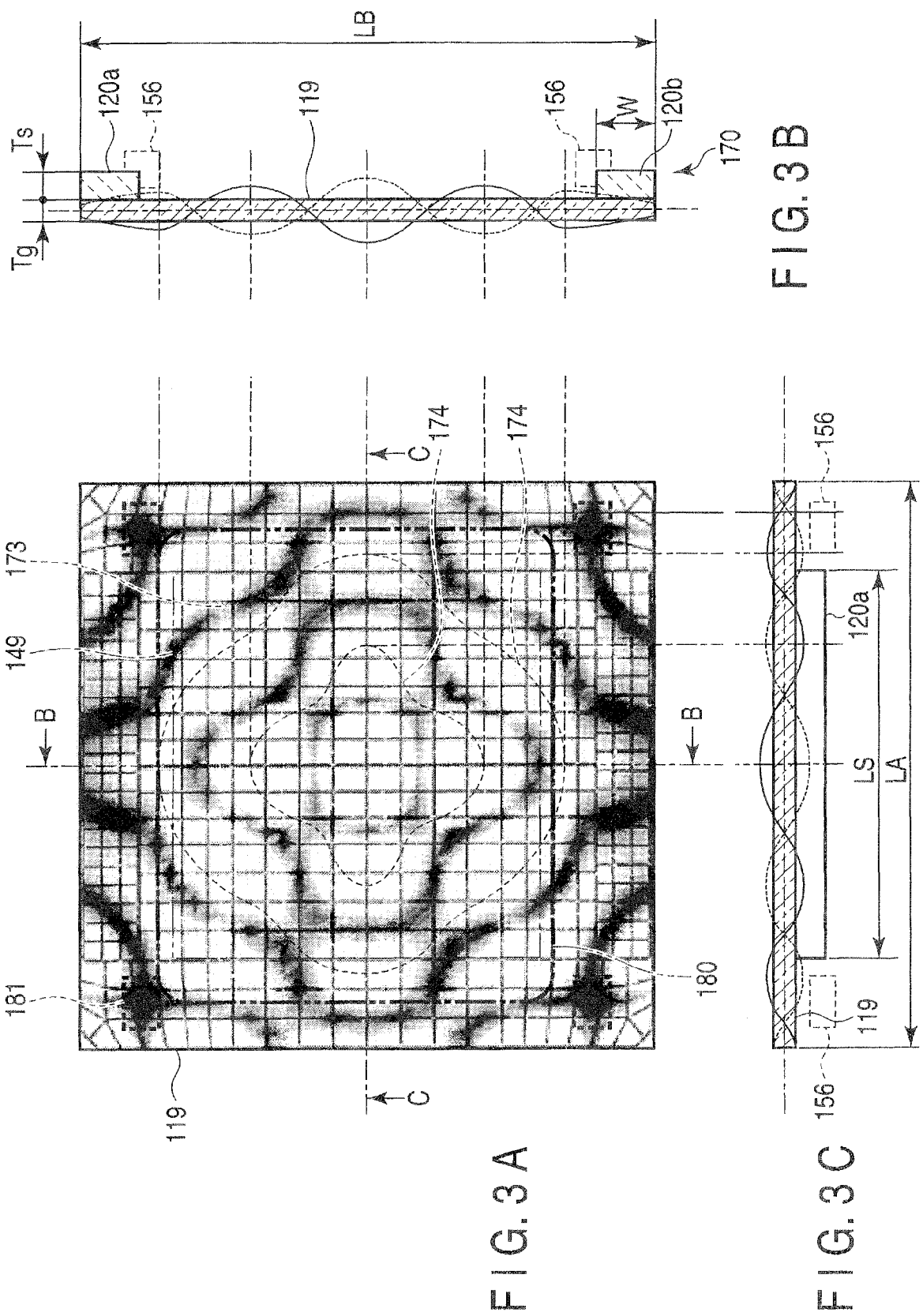
FIG. 3A is a front view of a dust filter, explaining how the dust filter is vibrated.
FIG. 3B is a sectional view of the dust filter, taken along line B-B shown in FIG. 3A.
FIG. 3C is a sectional view of the dust filter, taken along line C-C shown in FIG. 3A.

As shown in FIG. 2B, signal electrodes 171a and 172a are formed on the piezoelectric element 120a, and signal electrodes 171b and 172b are formed on the piezoelectric element 120b. Note that the hatched parts shown in FIG. 2B show the shapes of the signal electrodes clearly, not to illustrating the sections thereof. The signal electrodes 172a and 172b are provided on the back opposing the signal electrodes 171a and 171b, and are bent toward that surface of the piezoelectric element 120a, on which the signal electrodes 171a and 171b are provided. The flex 157a having the above-mentioned conductive pattern is electrically connected to the signal electrode 171a and signal electrode 172a. The flex 157b having the above-mentioned conductive pattern is electrically connected to the signal electrode 171b and signal electrode 172b. To the signal electrodes 171a, 171b, 172a and 172b, a drive voltage of the prescribed frequency is applied form the dust filter control circuit 121 through flexes 157a and 157b. The drive voltage, thus applied, can cause the dust filter 119 to undergo such a two-dimensional, standing-wave bending vibration as is shown in FIGS. 3A to 3C. The dust filter 119 is dimensioned such that the long sides are of length LA and the short sides are of length LB orthogonal to the long sides. Since the dust filter 119 shown in FIG. 3A is rectangular, it is identical in shape to the "virtual rectangle" according to this invention (later described). Hence, the long sides LA of the dust filter 119 are identical to the sides LF of the virtual rectangle that include the sides LA. The bending vibration shown in FIG. 3A is standing wave vibration. In FIG. 3A, the blacker the streaks, each indicating a node area 173 of vibration (i.e., area where the vibrational amplitude is small), the smaller the vibrational amplitude is. Note that the meshes shown in FIG. 3A are division meshes usually used in the final element method.

If the node areas 173 are at short intervals as shown in FIG. 3A when the vibration speed is high, in-plane vibration (vibration along the surface) will occur in the node areas 173. This vibration induces a large inertial force in the direction of the in-plane vibration (see mass point Y2 in FIG. 11, described later, which moves over the node along an arc around the node, between positions Y2 and Y2') to the dust at the node areas 173. If the dust filter 119 is inclined to become parallel to the gravity so that a force may act along the dust receiving surface, the inertial force and the gravity can remove the dust from the node areas 173.

In FIG. 3A, the white areas indicate areas where the vibrational amplitude is large. The dust adhering to any white area is removed by the inertial force exerted by the vibration. The dust can be removed from the node areas 173, too, by producing vibration in another mode (for example, the vibrational mode illustrated in FIG. 20), at similar amplitude at each node area 173.

Figure 4:
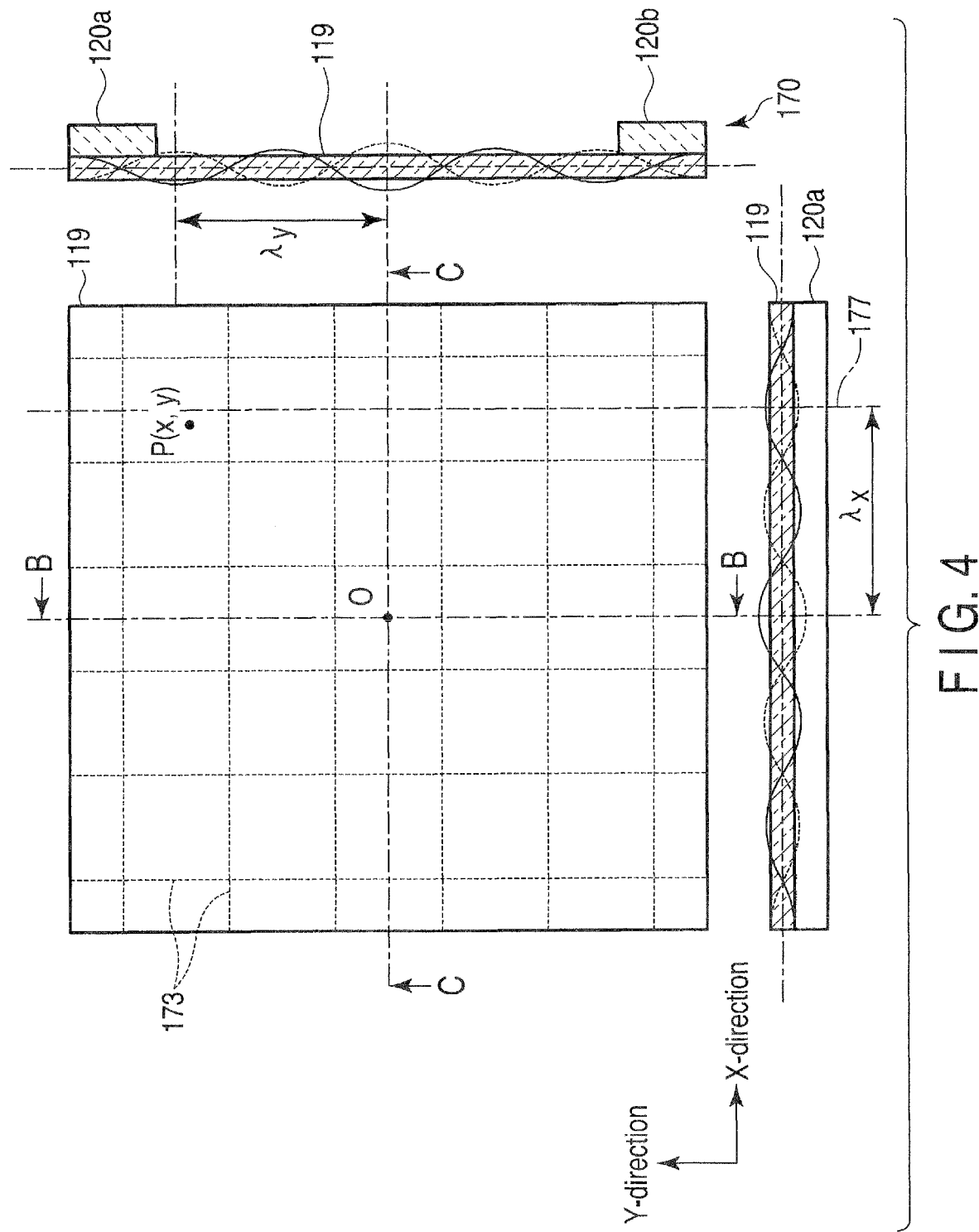
FIG. 4 is a diagram explaining the length of the long sides and that of the short sides of the dust filter.

The bending vibrational mode shown in FIG. 3A is achieved by synthesizing the bending vibration of the X-direction and the bending vibration of the Y-direction. The fundamental state of this synthesis is shown in FIG. 4. If the vibrator 170 is put on a member that little attenuates vibration, such as a foamed rubber block, and then made to vibrate freely, a vibrational mode of producing such lattice-shaped node areas 173 will be usually attained easily. In the front view included in FIG. 4, the broken lines define the centers of the node areas 173 (more precisely, the lines indicate the positions where the vibrational amplitude is minimal in the widthwise direction of lines). In this case, a standing wave, bending vibration at wavelength $\lambda_x$ occurs in the X-direction, and a standing wave, bending vibration at wavelength $\lambda_y$ occurs in the Y-direction. These standing waves are synthesized. With respect to the origin (x=0, y=0), toe vibration Z (x, y) at a given point P (x, y) is expressed by Equation 1, as follows:

$$Z(x,y) = A \cdot W_{mn}(x,y) \cdot \cos(\gamma) + A \cdot W_{nm}(x,y) \cdot \sin(\gamma) \quad (1)$$

where A is amplitude (a fixed value here, but actually changing with the vibrational mode or the power supplied to the piezoelectric elements); m and n are positive integers including 0, indicating the order of natural vibration corresponding to the vibrational mode; $\gamma$ is a given phase angle;

$$W_{mn}(x, y) = \sin\left(n\pi \cdot x + \frac{\pi}{2}\right) \cdot \sin\left(m\pi \cdot y + \frac{\pi}{2}\right); \text{ and}$$

$$W_{nm}(x, y) = \sin\left(m\pi \cdot x + \frac{\pi}{2}\right) \cdot \sin\left(n\pi \cdot y + \frac{\pi}{2}\right).$$

Assume that the phase angle $\gamma$ is 0 ($\gamma=0$). Then, Equation 1 changes to:

$$Z(x, y) = A \cdot W_{mn}(x, y)$$
$$= A \cdot \sin\left(\frac{n \cdot \pi \cdot x}{\lambda_x} + \frac{\pi}{2}\right) \cdot \sin\left(\frac{m \cdot \pi \cdot y}{\lambda_y} + \frac{\pi}{2}\right).$$

Further assume that $\lambda_x = \lambda_y = \lambda = 1$ (x and y are represented by the unit of the wavelength of bending vibration). Then:

$$Z(x, y) = A \cdot W_{mn}(x, y)$$
$$= A \cdot \sin\left(n \cdot \pi \cdot x + \frac{\pi}{2}\right) \cdot \sin\left(m \cdot \pi \cdot y + \frac{\pi}{2}\right).$$

Similarly, if $\gamma=\pi/2$, too, the front term of the equation (1) will be zero. Hence, a similar standing wave is generated. FIG. 4 shows the vibrational mode that is applied if m=n (since the X-direction vibration and the Y-direction vibration are identical in terms of order and wavelength, the dust filter 119 has a square shape). In this vibrational mode, the peaks, nodes and valleys of vibration appear at regular intervals in both the X-direction and the Y-direction, and vibration node areas 173 appear as a checkerboard pattern (conventional vibrational mode). In the vibrational mode where m=0, n=1, the vibration has peaks, nodes and valleys parallel to a side (LB) that extends parallel to the Y-direction. In the vibrational mode described above, the X-direction vibration and the Y-direction vibration are generated, independent of each other. Even if the X-direction vibration and the Y-direction vibration are synthesized, the amplitude of vibration (or vibration speed) will have the same value as in the case where only X-direction vibration is generated (forming nodes and peaks and valleys, all parallel to the side LB) or the case where only Y-direction vibration is generated (forming nodes and peaks and valleys, all parallel to the side LA). In these vibrational modes, the phase angle $\gamma$ is k×π/2 ($\gamma$=k×π/2) as pointed out before, if k is 0 or an integer (either positive or negative). That is, in these vibrational modes, cos $\gamma$ and sin $\gamma$ are 0.

Figure 5:
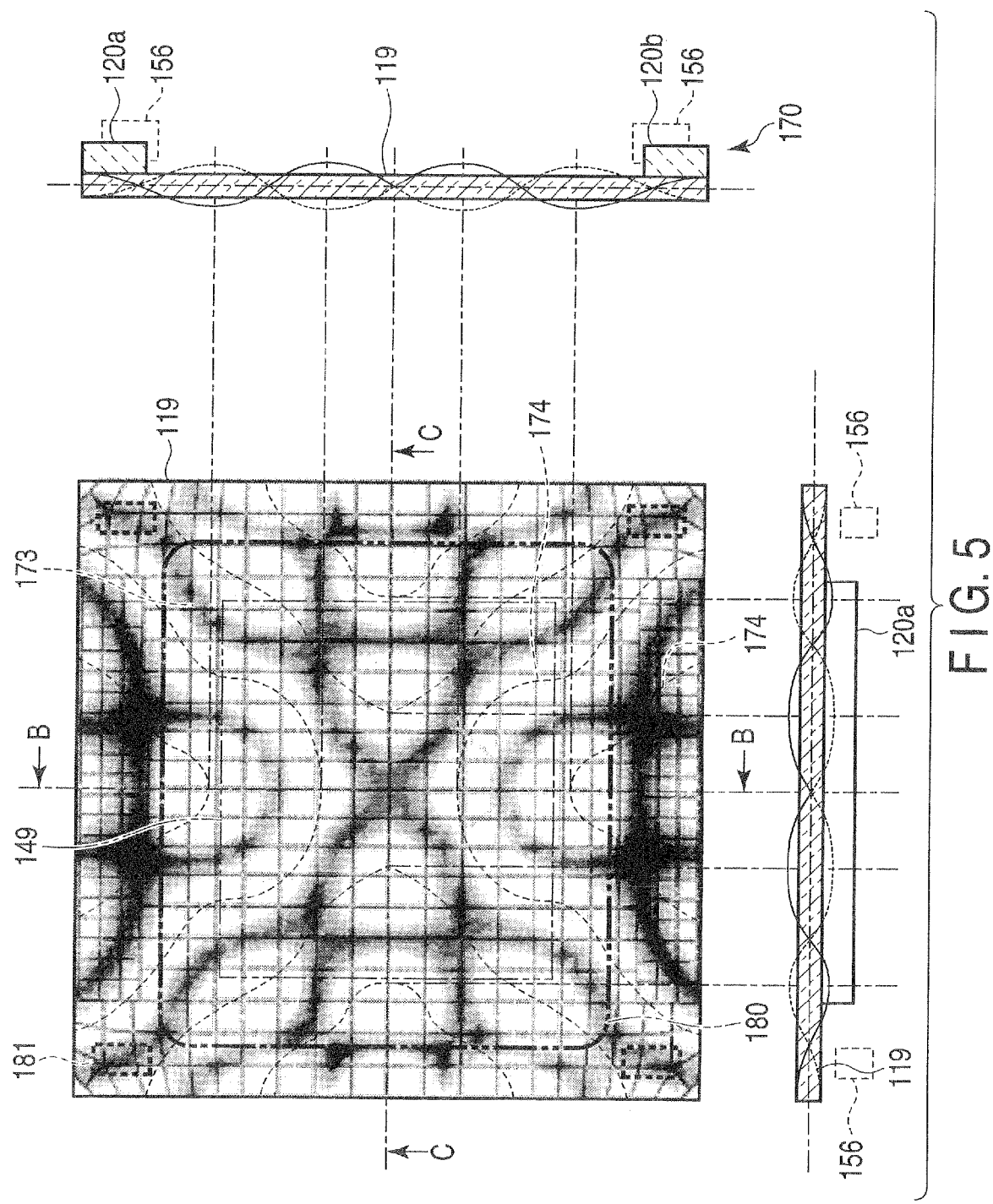
FIG. 5 is a diagram explaining how the dust filter is vibrated in another mode.

A vibrational mode in which the phase angle $\gamma$ has a different value will be explained. In view of this, the dust filter 119 may be elongated a little, shaped like a rectangle, and may be vibrated at a specific frequency, or in a mode where m=3 and n=2. In this vibrational mode, the phase angle $\gamma$ is +π/4 or ranges from −π/4 to −π/8. This vibrational mode is a mode in which the present embodiment will have very large vibrational amplitude (the maximum amplitude is at the same level as at the conventional circular dust filter). If $\gamma$=+π/4, the vibrational mode will be the mode shown in FIG. 3A. In this vibrational mode, the peak ridges 174 of vibrational amplitude form closed loops around the optical axis though the dust filter 119 is rectangular. Consequently, a reflected wave coming from a side extending in the X-direction and a reflected wave coming from a side extending in the Y-direction are efficiently combined, forming a standing wave. FIG. 5 shows a vibrational mode in which $\gamma$=−π/4 and which is achieved by changing the vibrational frequency of the dust filter 119 of FIG. 3A. In this vibrational mode, peak ridges 174 of vibrational amplitude are formed, surrounding the midpoint of each side. That is, the center of the dust filter 119 becomes a node area 173 where vibrational amplitude is scarcely observed. Peak ridges 174 of vibrational amplitude are formed, surrounding the midpoint of each side.

Figure 6:
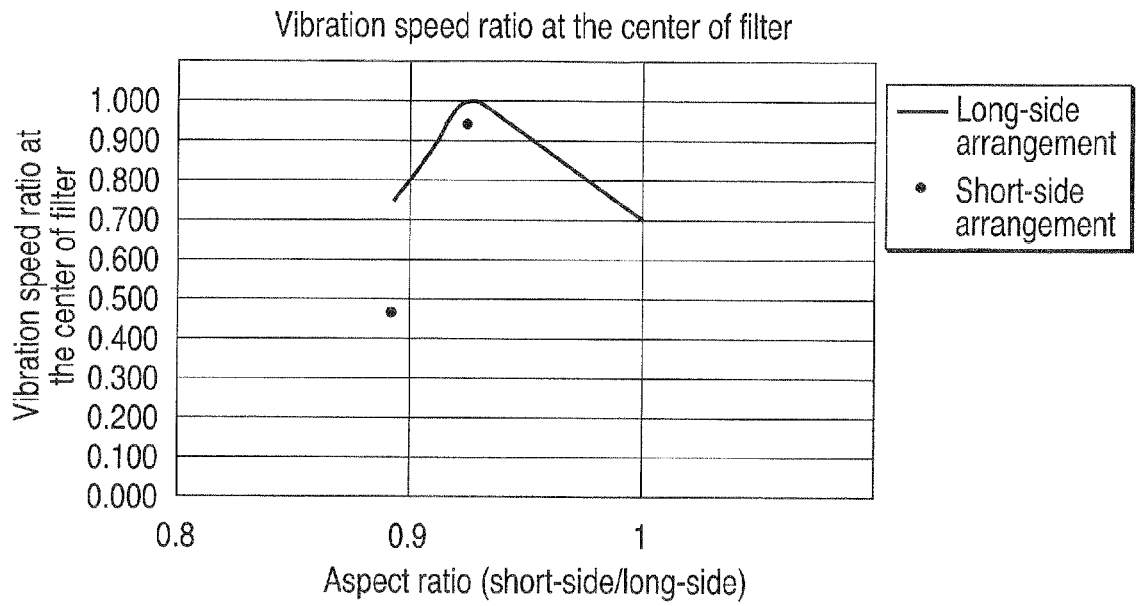
FIG. 6 is a diagram showing the relation between the aspect ratio of the dust filter shown in FIG. 3A and the vibration speed ratio of the center part of the dust filter.

The dust filter 119 of the vibrator 170, shown in FIG. 3A, is a glass plate (optical element) having size of 30.8 mm (X-direction: LA, LF)×28.5 mm (Y-direction: LB)×0.65 mm (thickness). The dust filter 119 is rectangular, having long sides LA (30.8 mm, extending in the X-direction) and short sides LB (28.5 mm). Therefore, the dust filter 119 is identical to the "virtual rectangle" according to this invention, which has the same area as the dust filter 119. The long sides LA of the dust filter 119 are arranged are thus identical to the sides LF of the virtual rectangle that includes the sides LA. The piezoelectric elements 120a and 120b are made of lead titanate-zirconate ceramic and have a size of 21 mm (X-direction: LP)×3 mm (Y-direction)×0.8 mm (thickness). The piezoelectric elements 120a and 120b are adhered with epoxy-based adhesive to the dust filter 119, extending along the upper and lower sides of the filter 119 (optical element), respectively. More specifically, the piezoelectric elements 120a and 120b extend in the X-direction and arranged symmetric in the left-right direction, with respect to the centerline of the dust filter 119, which extends in the Y-direction. In this case, the resonance frequency in the vibrational mode of FIG. 3A is in the vicinity of 91 kHz. At the center of the dust filter 119, a maximal vibration speed and vibrational amplitude can be attained if the dust filter is shaped like a circle in which the rectangular dust filter 119 is inscribed. The vibration-speed ratio, which is the ratio of maximum speed $V_{max}$ to the speed of vibration perpendicular to the plane of the center part of the dust filter 119, has such a value as shown in FIG. 6, the maximum value of which is 1.000. In the graph of FIG. 6, the line curve pertains to the case where the piezoelectric elements 120a and 120b are arranged parallel to the long sides of the dust filter 119, and the dots pertain to the case where the 120a and 120b are arranged parallel to the short sides of the dust filter 119. In this vibrational mode, the piezoelectric elements 120a and 120b should better be arranged at the longer sides of the dust filter 119. A higher vibration speed can be achieved than otherwise.

Figure 7:
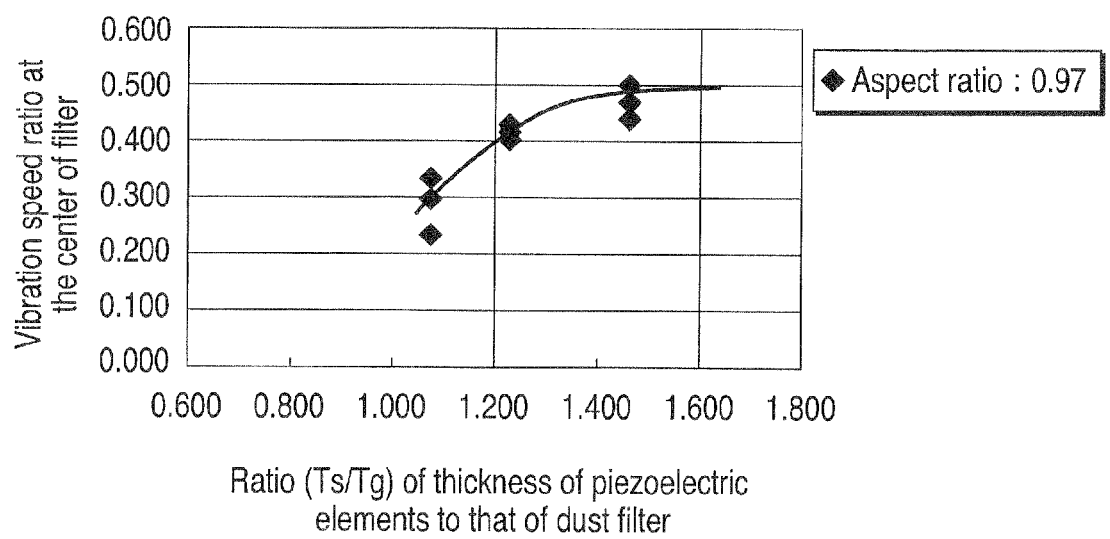
FIG. 7 is a diagram showing the relation the vibration speed ratio of the center part of the dust filter shown in FIG. 3A has with a thickness ratio which is a ratio of the dust filter to the piezoelectric elements in terms of thickness.

FIG. 7 is a diagram showing the relation the vibration speed ratio of the center part of the dust filter 119 shown in FIG. 3A has with a thickness ratio which is the ratio of the dust filter 119 to the piezoelectric elements 120a and 120b in terms of dimensions, or more precisely the relation the vibration speed ratio with the thickness ratio Ts/Tg, i.e., ratio of the thickness Ts of the piezoelectric elements 120a and 12b to the thickness Tg of the dust filter 119. FIG. 7 shows how the vibration speed ratio of the center part of the dust filter 119 changes with the thickness ratio Ts/Tg, i.e., ratio of the thickness Ts of the piezoelectric elements 120a and 120b to the thickness Tg of the dust filter 119, in the present embodiment, i.e., vibrator 170 that has such a large vibrational amplitude (or vibration speed) as shown in FIG. 3A. Note that the center of the dust filter 119 is a point at which a virtual vibrational axis that passes the midpoints (half-length point) the piezoelectric elements 120a and 120b intersects virtually with a virtual vibrational axis passing the midpoint (half-length point) of the dust filter 119. As shown in FIG. 7, the smaller the thickness ratio (Ts/Tg), the smaller the vibration speed ratio. Conversely, as the thickness ratio (Ts/Tg) increases, the vibration speed ratio does not increase so much, gradually changing to a specific value (near 1.0).

Thus, the vibration speed ratio increases in proportion to the thickness ratio while the thickness ratio between the dust filter and the piezoelectric elements remains less than 1.2, and increases like a quadratic function while the thickness ratio is equal to or greater than 1.2. That is, the vibration speed ratio more changes than the thickness ratio if the thickness ratio is less than 1.2. Therefore, if the thickness ratio is less than 1.2, the vibration speed greatly changes because of the thickness deviation of the piezoelectric elements 120a and 120b from the design value. In view of this, the thickness ratio (Ts/Tg) between the dust filter and the piezoelectric elements should better be set to 1.2 or more. As long as the thickness ratio (Ts/Tg) is 1.2 or more, the vibration speed can be at least 80% of the maximum vibration speed that can be attained.

On the other hand, the smaller the thickness Tg of the dust filter 119, the lower the breakage vibration speed of the dust filter 119. Hence, if the dust filter 119 has an excessively small thickness Tg, the breakage vibration speed will be lower than the vibration speed high enough to remove dust (this speed will be described later in detail). Conversely, the larger the thickness Tg of the dust filter 119, the higher the breakage vibration speed. However, the voltage applied to the piezoelectric elements 120a and 120b to attain a vibration speed high enough to move dust will increase. To increase the thickness ratio (Ts/Tg) between the dust filter and the piezoelectric elements, the thickness Ts of the piezoelectric elements 120a and 120b must be increased. As the thickness Ts is increased, the voltage applied to the piezoelectric elements 120a and 120b shall be increased, too. This will make the device larger. Such a digital camera, as the digital camera 10 according to this invention, needs to have a thin body unit 100. The larger the thickness ratio (Ts/Tg), the thicker the piezoelectric elements 120a and 120b will be. The body unit 100 will therefore thicker. Therefore, it is not desirable to increase the thickness ratio (Ts/Tg) so much. In consideration of the vibration speed needed, the voltage applied to the piezoelectric elements 120a and 120b, and the thickness Tg of the dust filter 119, it is desired that the thickness ratio (Ts/Tg) between the dust filter and the piezoelectric elements should be 1.6 or less.

The thickness ratio (Ts/Tg) should best be equal to or larger than 1.2, preferably near 1.2, because it changes only a little with the thickness deviation the piezoelectric elements 120a and 120b from the design value as is illustrated in FIG. 7. In FIG. 7, the aspect ratio of the dust filter 119 (i.e., ratio of the vertical side to the horizontal side) is 0.97. The same result will be attained, nevertheless, if the aspect ratio is equal to or greater than 0.9, and less than 1.0.

Figure 19:
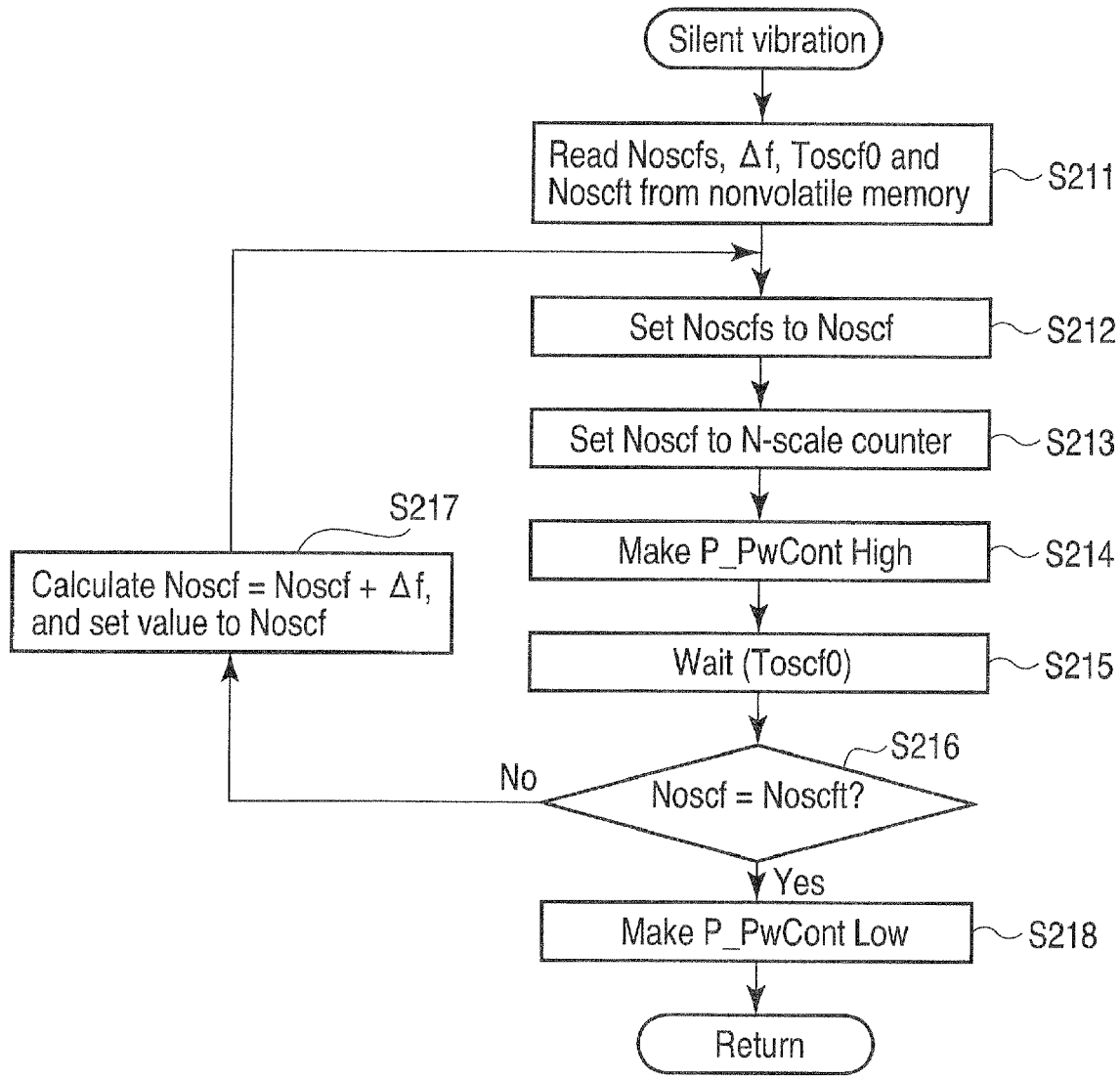
FIG. 19 is a flowchart showing the operating sequence of "silent vibration," i.e., subroutine in the operating sequence of the digital camera that is a second embodiment of the image equipment according to the present invention.

This holds true of the vibrational mode in which the vibrational amplitude gradually increases toward the center of the dust filter 119 and maximal at the center of the dust filter 119 as shown in FIG. 3A and as shown in FIG. 19 as will be explained later, and of the vibrational mode in which the vibrational amplitude is maximal near the center of the dust filter 119 as shown in FIG. 5. Two piezoelectric elements 120a and 120b are used in the present. Instead, only one piezoelectric element or three or more piezoelectric elements may be used in the present invention.

As described above, the dust filter 119 and the piezoelectric elements 120a and 120b are configured so that they may have a thickness ratio (Ts/Tg) of: $1.2 \leq Ts/Tg \leq 1.6$. This can provide a vibrating device that fully utilizes the vibrational characteristic of the dust-screening member, vibrating at a speed lower than the breakage vibration speed and removing dust at high efficiency, though it is so small that the voltage applied to the piezoelectric elements is low, falling within a specific range.

Figure 8:
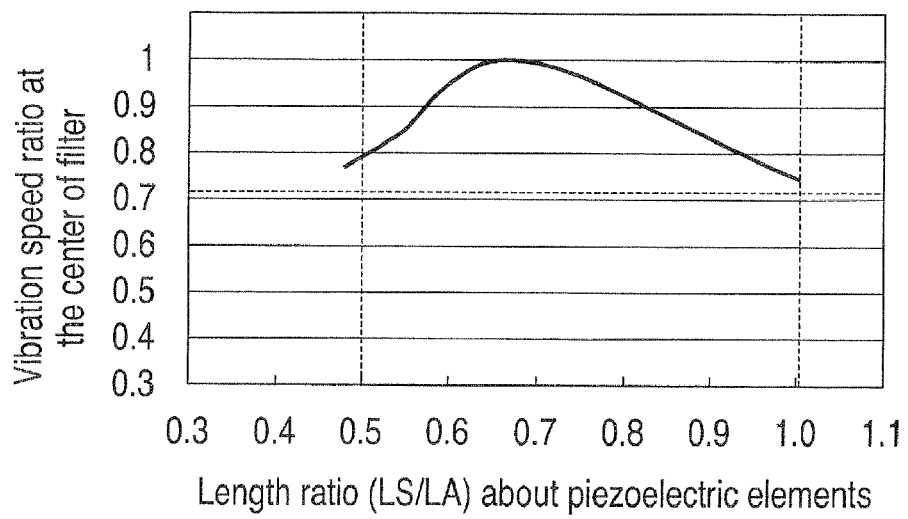
FIG. 8 is a diagram showing the relation the vibration speed ratio of the center part of the dust filter shown in FIG. 3A has with a length ratio about piezoelectric elements which is a ratio of a length of either long side of the piezoelectric elements to a length of the side of the dust filter, at which the piezoelectric elements are provided.

FIG. 8 shows the relation the vibration speed ratio of the dust filter shown 119 has with a length ratio about piezoelectric elements (Ls/LA) which is a ratio of the length Ls of the long sides of the piezoelectric elements 120a and 120b to the length LA of the dust filter 119 (i.e., length of the side at which the piezoelectric elements 120a and 120b are provided). As seen from FIG. 8, the vibration speed is the highest if the length ratio about piezoelectric elements Ls/LA is about 0.7, and is 0.7 or more as long as the length ratio about piezoelectric elements Ls/LA is ranges from 0.5 to 1.0, reducing the loss of vibration to about 30%.

On the basis of FIG. 6, the dust filter 119 is so shaped to vibrate in a vibrational mode of such very large amplitude as shown FIG. 3A or FIG. 5 (achieving high vibration speed and high vibrational acceleration). Moreover, the long sides of the piezoelectric elements arranged on the dust filter 119 is determined from the length ratio about piezoelectric elements Ls/LA falling within the range, to attain a large vibration speed ratio shown in FIG. 8. Further, the thickness of the piezoelectric elements arranged is determined from the thickness ratio Ts/Tg, to attain a large vibration speed ratio shown in FIG. 7. Since the dimensions and shape of the dust filter 119 and piezoelectric elements 120a and 120b are so determined, the dust filter 119 can achieve very high vibration speed, as high the conventional circular vibrating filter achieves. Note that the short sides of the piezoelectric elements 120*a* and 120*h* have length W that is half the wavelength of the vibrational mode.

Figure 9:
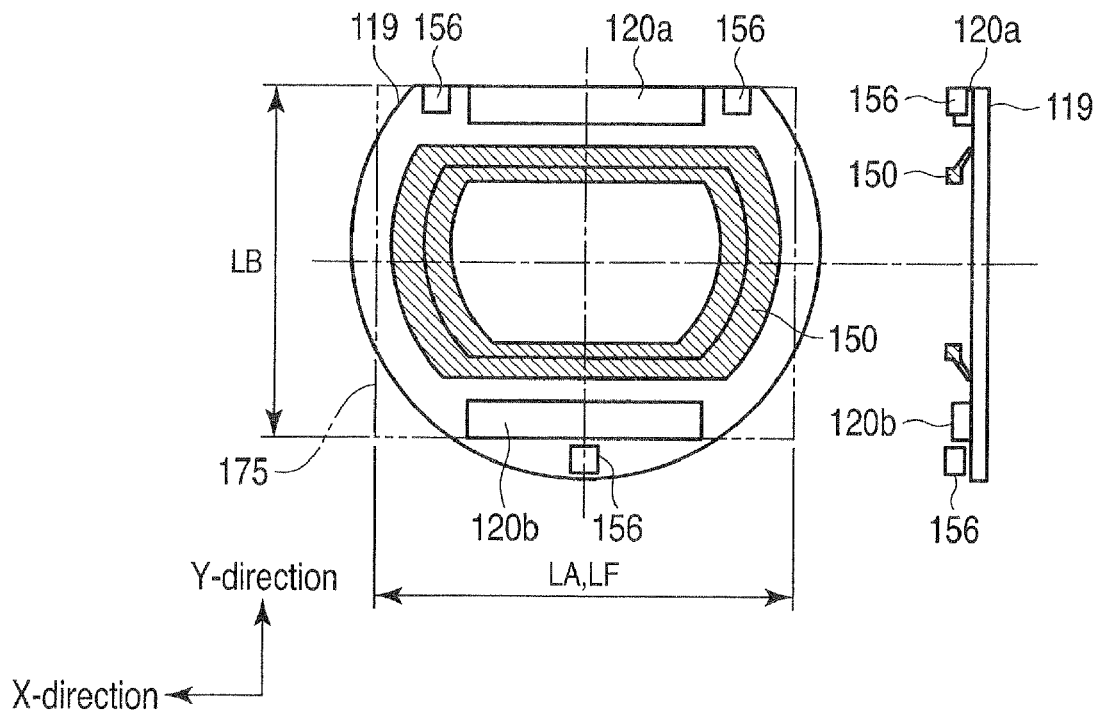
FIG. 9 is a diagram showing another configuration the dust filter may have.

FIG. 9 shows a modification of the vibrator 170. The modified vibrator 170 has a dust filter 119 that is D-shaped, formed by cutting a part of a plate shaped like a disc, thus defining one side. That is, the modified vibrator 170 uses a D-shaped dust filter 119 that has a side symmetric with respect to the symmetry axis extending in the Y-direction. The piezoelectric element 120*a* is arranged on the surface of the dust filter 119, extending parallel to that side and positioned symmetric with respect to the midpoint of the side (or to a symmetry axis extending in the Y-direction). On the other hand, the piezoelectric element 120*b* is substantially inscribed in the outer circumference of the dust filter 119 and extends parallel to that side of the dust filter 119. So shaped, the dust filter 119 is more symmetric with respect to its center (regarded as the centroid), and can more readily vibrate in a state desirable to the present embodiment. In addition, the dust filter 119 can be smaller than the circular one. Furthermore, since the piezoelectric elements 120*a* and 120*b* arranged parallel to the side, the asymmetry in terms vibration, resulting from the cutting, can be made more symmetric by increasing the rigidity. This helps to render the vibration state more desirable. Note that the long side and short side shown in FIG. 9 are the long and short sides of a virtual rectangle 175 which has the same area as the dust filter 119, one side of which includes the above-mentioned one side of the dust filter 119, and the opposite side of which extends along an outer side of the piezoelectric element 120*b*.

The dust filter 119 is supported because the seal 150 shaped like a deformed track as viewed in the front view is arranged and held between a holder (not shown) and the dust filter 119 and is pushed by an pushing member (not shown). As sown in the side view, the seal 150 has a lip-shaped cross section. The seal 150 having this lip-shaped cross section contacts the dust filter 119, sealing the space defined by the dust filter 119, holder 145, optical LPF 118 and seal 150. Further, cushion members 156 are provided on the holder 145 at three points. They support the dust filter 119 when an external force is exerted on the seal 150. The seal 150 contacts the dust filter 119, at its track-shaped lip part. The seal 150 therefore extends along the node area of vibration generated in the dust filter 119 and surrounding the center of the dust filter 119. Hence, the seal 150 less impeding the vibration of the dust filter 119 than otherwise. Since the corners (and lip part) of the seal 150 are obtuse-angled, they will be scarcely deformed when the seal 150 receives an external force. This is why the corners of the seal 150 are not arced as in the configuration of FIG. 2B.

Figure 10:
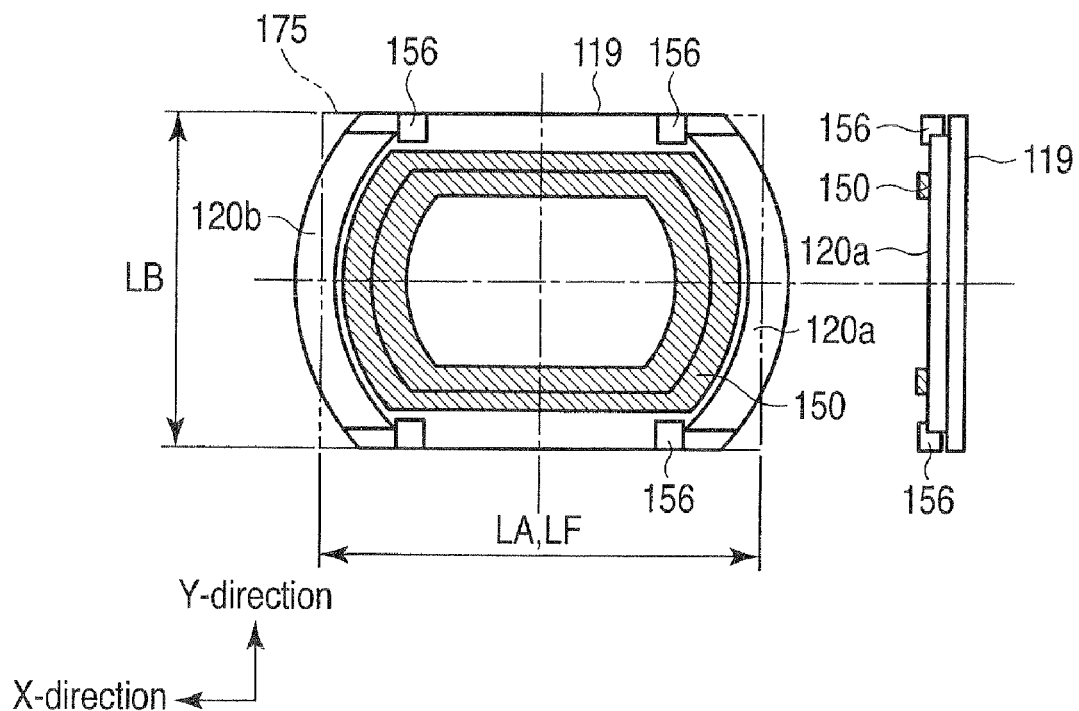
FIG. 10 is a diagram showing still another configuration the dust filter may have.

FIG. 10 shows another modification of the vibrator 170. This modified vibrator 170 has a dust filter 119 is formed by cutting a circular plate along two parallel lines, forming two parallel sides. That is, the modified vibrator 170 uses a dust filter 119 that has two sides symmetric with respect to the symmetry axis extending in the Y-direction. In this case, actuate piezoelectric elements 120*a* and 120*b* are arranged not on the straight sides, but on the curved parts defining a circle. Since the dust filter 119 is so shaped, the piezoelectric elements 120*a* and 120*b* are arranged, efficiently providing a smaller vibrator 170. Note that the long side and shot side shown in FIG. 10 are the long and short sides of a virtual rectangle 175 which has the same area as the dust filter 119, two opposite sides of which extend along the opposite two sides of the dust filter 119, respectively. The seal 150, which is a supporting member, has a rectangular cross section and made of soft material such as foamed rubber or felt. Therefore, the seal 150 attenuates the vibration only a little as in the other embodiments. This configuration is identical to that of FIG. 9 in any other respects, and will not be described in detail.

Figure 11:
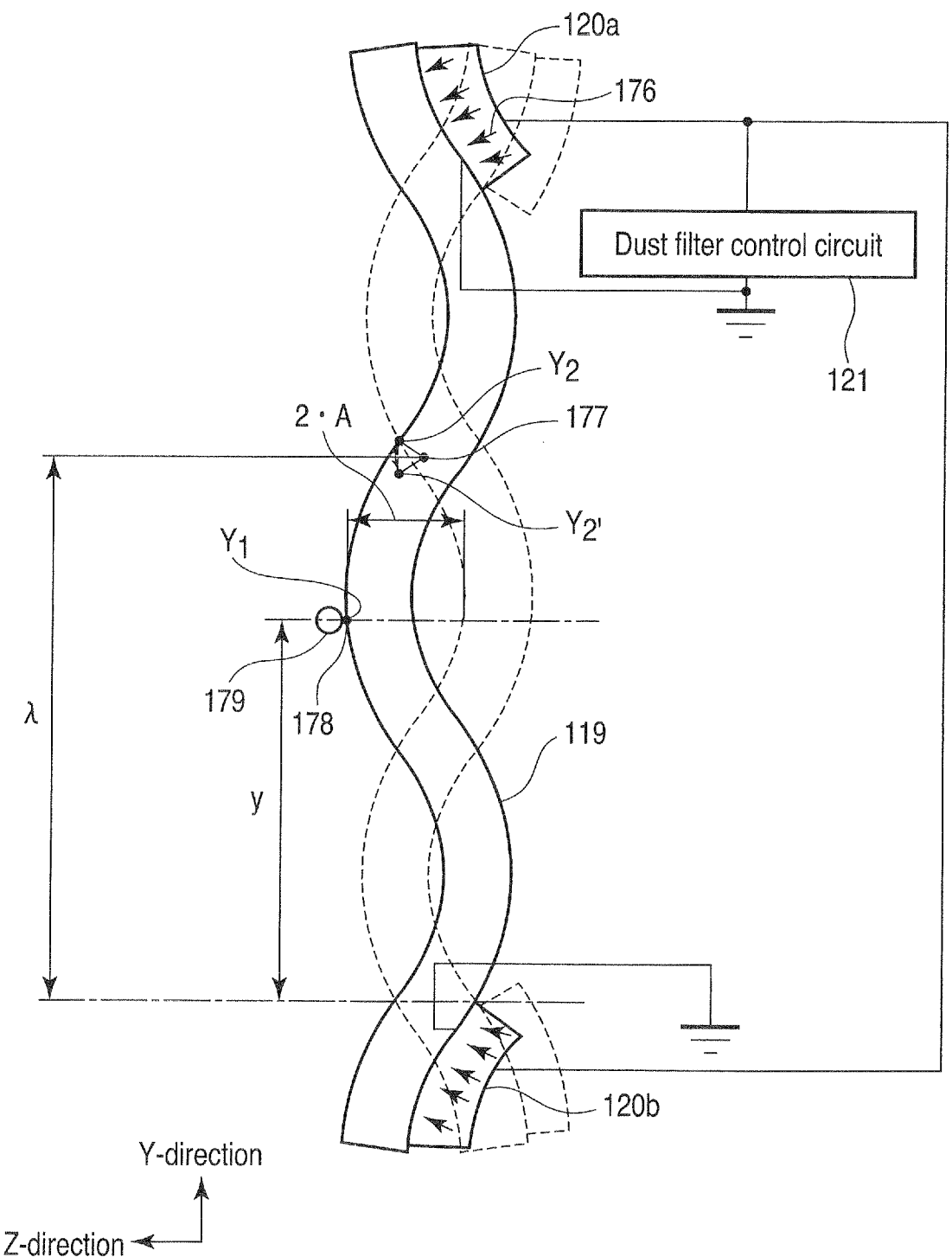
FIG. 11 is a conceptual diagram of the dust filter, explaining the standing wave that is produced in the dust filter.

A method of removing dust will be explained in detail, with reference to FIG. 11. FIG. 11 shows a cross section identical to that shown in FIG. 3B. Assume that the piezoelectric elements 120*a* and 120*b* are polarized in the direction of arrow 176 as shown in FIG. 11. If a voltage of a specific frequency is applied to the piezoelectric elements 120*a* and 120*b* at a certain time $t_0$, the vibrator 170 will be deformed as indicated by solid lines. At the mass point Y existing at given position y in the surface of the vibrator 170, the vibration z in the Z-direction is expressed by Equation 2 follows:

$$z = A \cdot \sin(Y) \cdot \cos(\omega t) \qquad (2)$$

where $\omega$ is the angular velocity of vibration, A is the amplitude of vibration in the Z-direction, and $Y = 2\pi y/\lambda$ ($\lambda$: wavelength of bending vibration).

The Equation 2 represents the standing-wave vibration shown in FIG. 3A. Thus, if $y = s \cdot \lambda/2$ (here, is an integer), then $Y = s\pi$, and $\sin(Y) = 0$. Hence, a node 177, at which the amplitude of vibration in the Z-direction is zero irrespective of time, exists for every $\pi/2$. This is standing-wave vibration. The state indicated by broken lines in FIG. 11 takes place of $t = k\pi/\omega$ (k is odd), where the vibration assumes a phase opposite to the phase at time $t_0$.

Vibration $z(Y_1)$ at point $Y_1$ on the dust filter 119 is located at an antinode 178 of standing wave, bending vibration. Hence, the vibration in the Z-direction has amplitude A, as expressed in Equation 3, as follows:

$$z(Y_1) = A \cdot \cos(\omega t) \qquad (3)$$

If Equation 3 is differentiated with time, the vibration speed $Vz(Y_1)$ at point $Y_1$ is expressed by Equation 4, below, because $\omega = 2\pi f$, where f is the frequency of vibration:

$$Vz(Y_1) = \frac{d(z(Y_1))}{dt} = -2\pi f \cdot A \cdot \sin(\omega t) \qquad (4)$$

If Equation 4 is differentiated with time, vibration acceleration $\alpha z(Y_1)$ is expressed by Equation 5, as follows:

$$\alpha z(Y_1) = \frac{d(Vz(Y_1))}{dt} = -4\pi^2 f^2 \cdot A \cdot \cos(\omega t) \qquad (5)$$

Therefore, the dust 179 adhering at point $Y_1$ receives the acceleration of Equation 5. The inertial force Fk the dust 179 receives at this time is given by Equation 6, as follows:

$$Fk = \alpha z(Y_1) \cdot M = -4\pi^2 f^2 \cdot A \cdot \cos(\omega t) \cdot M \qquad (6)$$

where M is the mass of the dust 179.

As can be seen from Equation 6, the inertial force Fk increases as frequency f is raised, in proportion to the square of f. However, the inertial force cannot be increased if amplitude A is small, no matter how much frequency f is raised. Generally, kinetic energy of vibration can be produced, but in a limited value, if the piezoelectric elements 120*a* and 120*b* that produce the kinetic energy have the same size. Therefore, if the frequency is raise in the same vibrational mode, vibrational amplitude A will change in inverse proportion to the square of frequency f. Even if the resonance frequency is raised to achieve a higher-order resonance mode, the vibrational frequency will fall, not increasing the vibration speed or the vibration acceleration. Rather, if the frequency is raised, ideal resonance will hardly be accomplished, and the loss of vibrational energy will increase, inevitably decreasing the vibration acceleration. That is, the mode cannot attain large amplitude if the vibration is produced in a resonance mode that uses high frequency only. The dust removal efficiency will be much impaired.

Although the dust filter 119 is rectangular, the peak ridges 174 of vibrational amplitude form closed loops around the optical axis in the vibrational mode of the embodiment, which is shown in FIG. 3A. In the vibrational mode of the embodiment, which is shown in FIG. 5, the peak ridges 174 of vibrational amplitude form curves surrounding the midpoint of each side. The wave reflected from the side extending in the X-direction and the wave reflected from the side extending in the Y-direction are efficiently synthesized, forming a standing wave. The method of supporting the dust filter 119 in this vibrational mode is identical to the method explained with reference to FIG. 3A. FIG. 5 shows a seal contact area 180 and support areas 181. In the seal contact area 180, the seal 150 contacts the dust filter 119. In the support areas 181, the cushion members 156 support the dust filter 119 when an external force acts on the dust filter 119. The seal contact area 180 and the support areas 181 are located near vibration nodes area 173 and are small areas in which the vibrational amplitude is small. Hence, they scarcely impede the vibration generated in the dust filter 119.

The shape and size of the dust filter 119 greatly contribute to efficient generation of this synthesized standing wave. As from FIG. 6, it is better to set the aspect ratio (short side/long side, i.e., ratio of the length of the short sides to that of the long sides of the dust filter 119) to a value smaller than 1, than to 1 (to make the dust filter 119 square). If the aspect ratio is smaller than 1, the speed of vibration at the center of the dust filter 119, in the Z-direction will be higher (the vibration speed ratio is 0.7 or more), no matter how the piezoelectric elements 120a and 120h are arranged. In FIG. 6, the ratio ($V/V_{max}$) of the vibration speed V to the maximum vibration speed $V_{max}$ possible in this region is plotted on the ordinate. The maximum aspect ratio (i.e., short side/long side) is, of course, 1. At the aspect ratio of 0.9 or less, the vibration speed abruptly decreases. Therefore, the dust filter 119 preferably has an aspect ratio (short side/long side) of 0.9 to 1, but less than 1. The two dots in FIG. 6, which pertain to the case where the 120a and 120b are arranged parallel to the short sides of the dust filter 119, indicate vibration speed ratios, which are smaller than the vibration speed ratios attainable if the piezoelectric elements 120a and 120h are arranged parallel to the long sides of the dust filter 119. It is therefore advisable to arrange the piezoelectric elements 120a and 120b at the long sides of the dust filter 119, not at the short sides thereof. If the elements 120a and 120b or so arranged, the vibration speed ratio will increase to achieve a high dust removal ability. The maximum vibration speed ratio is attained in FIG. 6 in the case where the vibrational mode is that of FIG. 3A and $\gamma=+\pi/4$ in the equation (1).

In vibration wherein the peak ridges 174 of vibrational amplitude form closed loops around the optical axis or the peak ridges 174 form curves surrounding the midpoint of each side, the dust filter 119 can undergo vibration of amplitude a similar to that of concentric vibration that may occur if the dust filter 119 has a disc shape. In any vibrational mode in which the amplitude is simply parallel to the side, the vibration acceleration is only 10% or more of the acceleration achieved in this embodiment.

In the vibration wherein the peak ridges 174 of vibrational amplitude form closed loops or curves surrounding the midpoint of each side, the vibrational amplitude is the largest at the center of the vibrator 170 and small at the closed loop or the curve at circumferential edges. Thus, the dust removal capability is maximal at the center of the image. If the center of the vibrator 170 is aligned with the optical axis, the shadow of dust 179 will not appear in the center part of the image, which has high image quality. This is an advantage.

In the vibration node areas 173, which exist in the focusing-beam passing area, the nodes 177 may be changed in position by changing the drive frequencies of the piezoelectric elements 120a and 120b. Then, the elements 120a and 120b resonate in a different vibrational mode, whereby the dust can be removed, of course.

A vibration state that is attained if the piezoelectric elements 120a and 120b are driven at a frequency near the resonance frequency will be described. The electrical equivalent circuit having a resonant frequency similar to that of the vibrator 170 composed of the piezoelectric elements 120a and 120b is represented as a parallel circuit of an LCR serial circuit and an electrostatic capacitance $C_0$. $C_0$ is the electrostatic capacitance attained as long as the piezoelectric elements 120a and 120b remain connected in parallel, and L, C and R are the values of a coil, capacitor and resistor that constitute an electric circuit equivalent to the mechanical vibration of the vibrator 170. Naturally, these values change with the frequency.

When the frequency changes to resonance frequency $f_0$, L and C achieve resonance. As the frequency is gradually raised toward the resonance frequency from the value at which no resonance takes place, the vibration phase of the vibrator 170 changes with respect to the phase of vibration of the piezoelectric elements 120a and 120b. When the resonance starts, the phase reaches $\pi/2$. As the frequency is further raised, the phase reaches $\pi$. If the frequency is raised even further, the phase starts decreasing. When the frequency comes out of the resonance region, the phase becomes equal to the phase where no resonance undergoes at low frequencies. In the actual situation, however, the vibration state does not become ideal. The phase does not change to $\pi$ in some cases. Nonetheless, the drive frequency can be set to the resonance frequency.

Support areas 181 existing at the four corners, which are shown in FIG. 3A and FIG. 5, are areas in which virtually no vibration takes place. Therefore, when pushed in Z direction with an external force, these parts hold the dust filter 119 through the cushion members 156 that are made of vibration-attenuating material such as rubber. So held, the dust filter 119 can be reliably supported without attenuating the vibration, because the lip part 150a of the seal 150 displaces only a little and the pushing force of the seal 150 does not increase. Moreover, the lip part 150a reliably restores its initial shape when it is released from the external force. Made of rubber or the like, the cushion members 153 can allow the dust filter 119 to vibrate in plane and never attenuate the in-plane vibration of the dust filer. The user may remove the exchange lens and may then remove fine dust particles from the surface of the dust filter 119, using a cleaning device. While being so cleaned, the dust filter 119 may receive an external force. In this case, the external force would act directly on the seal 150, twisting the seal 150, if the supporting/pushing structure had not the configuration according to this embodiment. Even after released from the external force, the lip part 150a of the seal 150 should remain deformed, not restoring its initial shape. The dust filter 119 must be cleaned for the following reason. That is, fine dust particles (having a mass resulting in a small inertial force when vibrated) and fine liquid particles having a large adhesive force cannot be removed by vibrating the dust filter 119, as will be explained later. Many fine dust particles or fine liquid particles remaining on the dust filter 119 lower the transmittance the dust filter 119 has with respect to a focusing-beam, as will be explained later. Hence, the surface of the dust filter 119 must be cleaned if it is excessively unclean with fine dust particles or fine liquid particles.

On the other hand, the seal 150 must be provided in the area having vibrational amplitude, too. In the vibrational mode of the present invention, the peripheral vibrational amplitude is small. In view of this, the lip part 150a of the seal 150 holds the circumferential part of the dust filter 119 and receives a small pressing force. As a result, the force does not greatly act in the amplitude direction of bending vibration. Therefore, the seal 156 attenuates, but very little, the vibration whose amplitude is inherently small. As shown in FIG. 3A and FIG. 5, as many seal-contact parts 180 as possible contact the node areas 173 in which the vibrational amplitude is small. This further reduces the attenuation of vibration.

The prescribed frequency at which to vibrate the piezoelectric elements 120a and 120b is determined by the shape, dimensions, material and supported state of the dust filter 119, which is one component of the vibrator 170. In most cases, the temperature influences the elasticity coefficient of the vibrator 170 and is one of the factors that change the natural frequency of the vibrator 170. Therefore, it is desirable to measure the temperature of the vibrator 170 and to consider the change in the natural frequency of the vibrator 170, before the vibrator 170 is used. A temperature sensor (not shown) is therefore connected to a temperature measuring circuit (not shown), in the digital camera 10. The value by which to correct the vibrational frequency of the vibrator 170 in accordance with the temperature detected by the temperature sensor is stored in the nonvolatile memory 128. Then, the measured temperature and the correction value are read into the Bucom 101. The Bucom 101 calculates a drive frequency, which is used as drive frequency of the dust filter control circuit 121. Thus, vibration can be produced, which is efficient with respect to temperature changes, as well.

Figure 13:
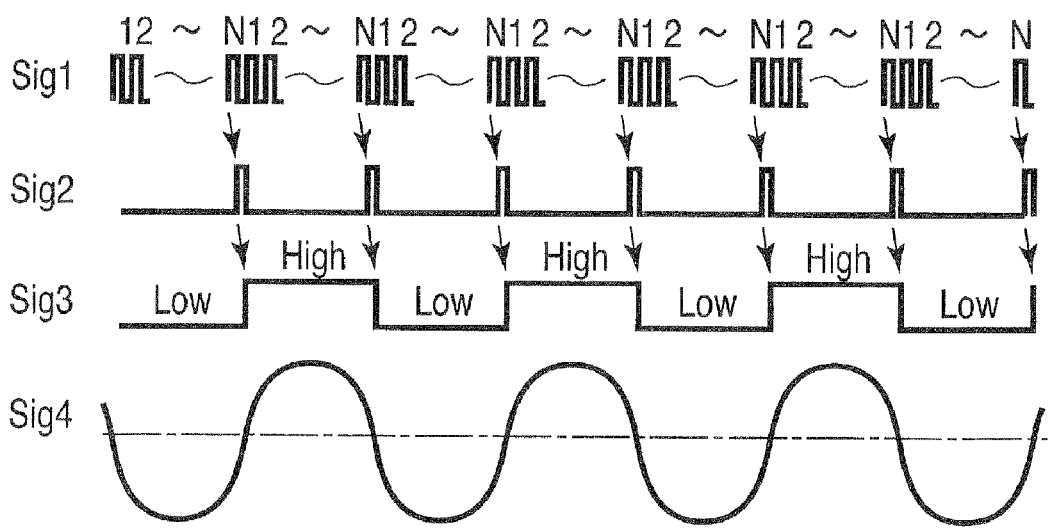
FIG. 13 is a timing chart showing the signals output from the components of the dust filter control circuit.

The dust filter control circuit 121 of the digital camera 10 according to this invention will be described below, with reference to FIGS. 12 and 13. The dust filter control circuit 121 has such a configuration as shown in FIG. 12. The components of the dust filter control circuit 121 produce signals (Sig1 to Sig4) of such waveforms as shown in the timing chart of FIG. 13. These signals will control the dust filter 119, as will be described below.

More specifically, as shown in FIG. 12, the dust filter control circuit 121 comprises a N-scale counter 182, a half-frequency dividing circuit 183, an inverter 184, a plurality of MOS transistors $Q_{00}$, $Q_{01}$ and $Q_{02}$, a transformer 185, and a resistor $R_{00}$.

The dust filter control circuit 121 is so configured that a signal (Sig4) of the prescribed frequency is produced at the secondary winding of the transformer 185 when MOS transistors $Q_{01}$ and $Q_{02}$ connected to the primary winding of the transformer 185 are turned on and off. The signal of the prescribed frequency drives the piezoelectric elements 120a and 120b, thereby causing the vibrator 170, to which the dust filter 119 is secured, to produce a resonance standing wave.

The Bucom 101 has two output ports P_PwCont and D_NCnt provided as control ports, and a clock generator 186. The output ports P_PwCont and D_NCnt and the clock generator 186 cooperate to control the dust filter control circuit 121 as follows. The clock generator 186 outputs a pulse signal (basic clock signal) having a frequency much higher than the frequency of the signal that will be supplied to the piezoelectric elements 120a and 120b. This output signal is signal Sig1 that has the waveform shown in the timing chart of FIG. 13. The basic clock signal is input to the N-scale counter 182.

The N-scale counter 182 counts the pulses of the pulse signal. Every time the count reaches a prescribed value "N," the N-scale counter 182 produces a count-end pulse signal. Thus, the basic clock signal is frequency-divided by N. The signal the N-scale counter 182 outputs is signal Sig2 that has the waveform shown in the timing chart of FIG. 13.

The pulse signal produced by means of frequency division does not have a duty ratio of 1:1. The pulse signal is supplied to the half-frequency dividing circuit 183. The half-frequency dividing circuit 183 changes the duty ratio of the pulse signal to 1:1. The pulse signal, thus changed in terms of duty ratio, corresponds to signal Sig3 that has the waveform shown in the timing chart of FIG. 13.

While the pulse signal, thus changed in duty ratio, is high, MOS transistor $Q_{01}$ to which this signal has been input is turned on. In the meantime, the pulse signal is supplied via the inverter 184 to MOS transistor $Q_{02}$. Therefore, while the pulse signal (signal Sig3) is low state, MOS transistor $Q_{02}$ to which this signal has been input is turned on. Thus, the transistors $Q_{01}$ and $Q_{02}$, both connected to the primary winding of the transformer 185, are alternately turned on. As a result, a signal Sig4 of such frequency as shown in FIG. 13 is produced in the secondary winding of the transformer 185.

The winding ratio of the transformer 185 is determined by the output voltage of the power-supply circuit 135 and the voltage needed to drive the piezoelectric elements 120a and 120b. Note that the resistor $R_{00}$ is provided to prevent an excessive current from flowing in the transformer 185.

In order to drive the piezoelectric elements 120a and 120b, MOS transistor $Q_{00}$ must be on, and a voltage must be applied from the power-supply circuit 135 to the center tap of the transformer 185. In this case, MOS transistor $Q_{00}$ is turned on or off via the output port P_PwCont of the Bucom 101. Value "N" can be set to the N-scale counter 182 from the output port D_NCnt of the Bucom 101. Thus, the Bucom 101 can change the drive frequency for the piezoelectric elements 120a and 120b, by appropriately controlling value "N."

The frequency can be calculated by using Equation 7, as follows:

$$fdrv = \frac{fpls}{2N} \tag{7}$$

where N is the value set to the N-scale counter 182, fpls is the frequency of the pulse output from the clock generator 186, and fdrv is the frequency of the signal supplied to the piezoelectric elements 120a and 120b.

The calculation based on Equation 7 is performed by the CPU (control unit) of the Bucom 101.

If the dust filter 119 is vibrated at a frequency in the ultrasonic region (i.e., 20 kHz or more), the operating state of the dust filter 119 cannot be aurally discriminated, because most people cannot hear sound falling outside the range of about 20 to 20,000 Hz. This is why the operation display LCD 129 or the operation display LED 130 has a display unit for showing how the dust filter 119 is operating, to the operator of the digital camera 10. More precisely, in the digital camera 10, the vibrating members (piezoelectric elements 120a and 120b) imparts vibration to the dust-screening member (dust filter 119) that is arranged in front of the CCD 117, can be vibrated and can transmit light. In the digital camera 10, the display unit is operated in interlock with the vibration control unit (i.e., dust filter control circuit 121), thus informing how the dust filter 119 is operating (later described in detail).

Figure 14A:
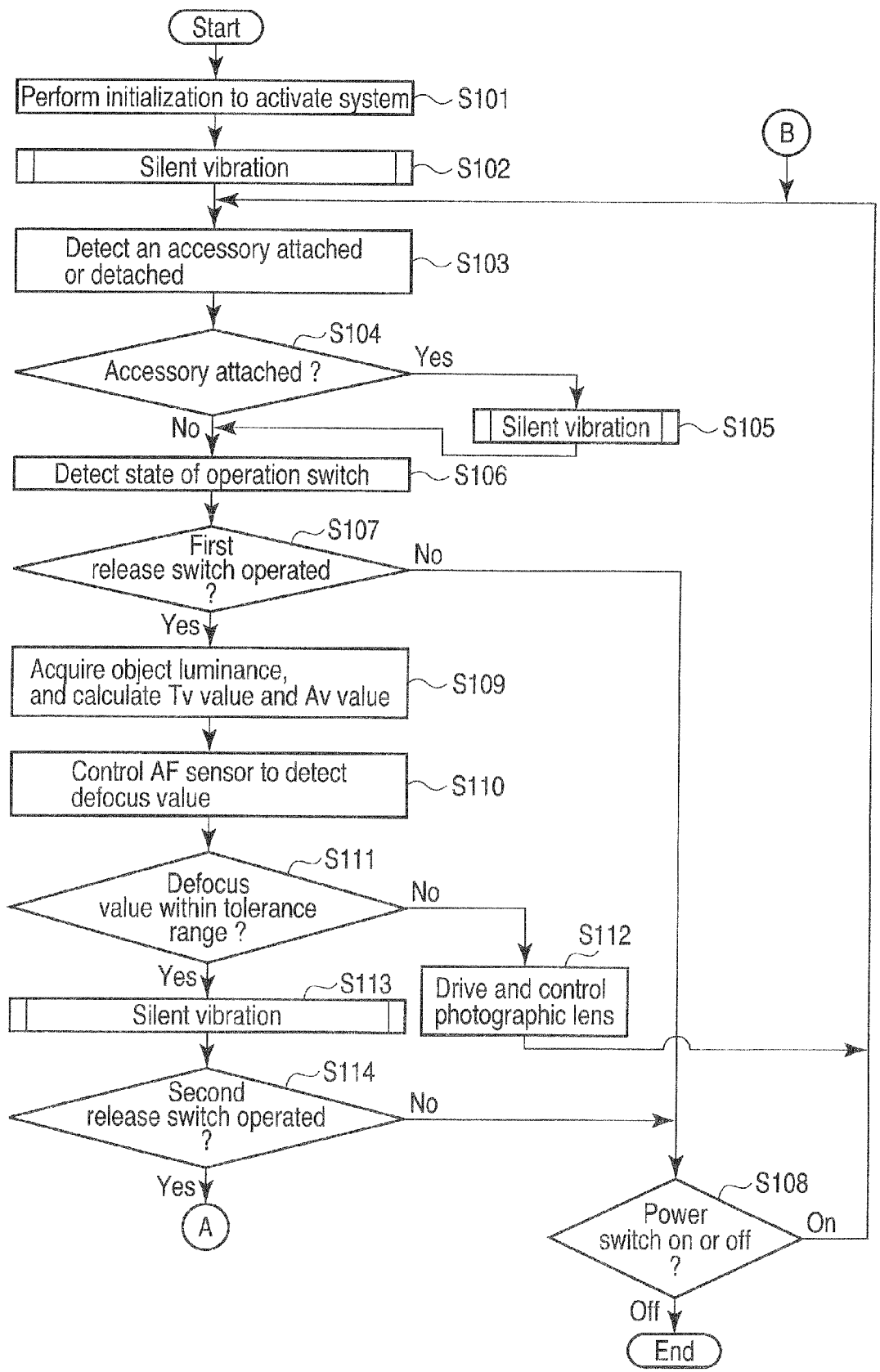
FIG. 14A is the first part of a flowchart showing an exemplary camera sequence (main routine) performed by the microcomputer for controlling the digital camera body according to the first embodiment.
Figure 14B:
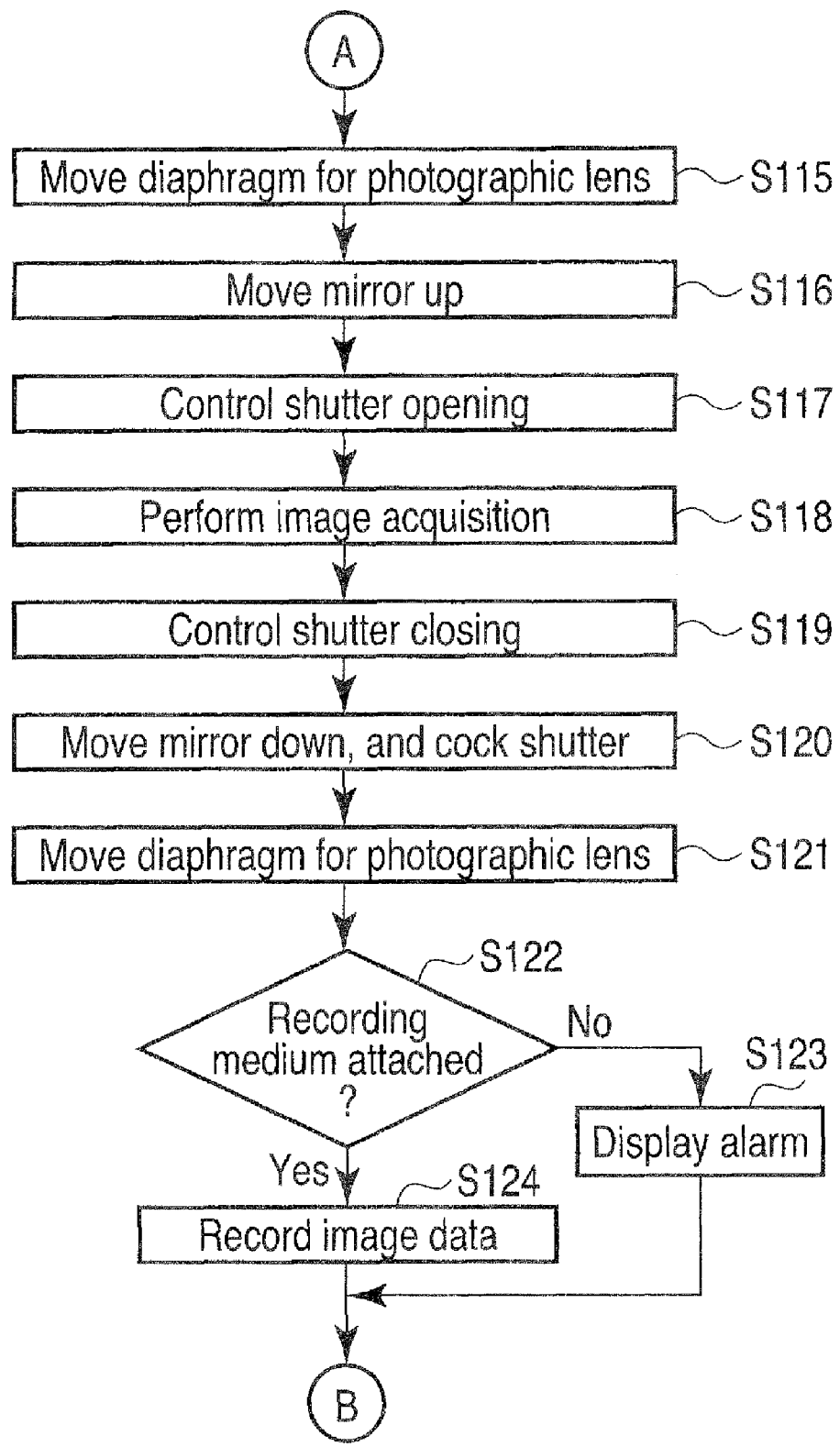
FIG. 14B is the second part of the flowchart showing the exemplary camera sequence (main routine)

To explain the above-described characteristics in detail, the control the Bucom 101 performs will be described with reference to FIGS. 14A to 18. FIGS. 14A and 14B show the flowchart that relates to the control program, which the Bucom 101 starts executing when the power switch (not shown) provided on the body unit 100 of the camera 10 is turned on.

First, a process is performed to activate the digital camera 10 (Step S101). That is, the Bucom 101 control the power-supply circuit 135. So controlled, the power-supply circuit 135 supplies power to the other circuit units of the digital camera 10. Further, the Bucom 101 initializes the circuit components.

Next, the Bucom 101 calls a sub-routine "silent vibration," vibrating the dust filter 119, making no sound (that is, at a frequency falling outside the audible range) (Step S102). The "audible range" ranges from about 200 to 20,000 Hz, because most people can hear sound falling within this range.

Steps S103 to S124, which follow, make a group of steps that is cyclically repeated. That is, the Bucom 101 first detects whether an accessory has been attached to, or detached from, the digital camera 10 (Step S103). Whether the lens unit 200 (i.e., one of accessories), for example, has been attached to the body unit 100 is detected. This detection, e.g., attaching or detaching of the lens unit 200, is performed as the Bucom 101 communicates with the Lucom 201.

If a specific accessory is detected have been attached to the body unit 100 (YES in Step S104), the Bucom 101 calls a subroutine "silent vibration" and causes the dust filter 119 to vibrate silently (Step S105).

While an accessory, particularly the lens unit 200, remains not attached to the body unit 100 that is the camera body, dust is likely to adhere to each lens, the dust filter 119, and the like. It is therefore desirable to perform an operation of removing dust at the time when it is detected that the lens unit 200 is attached to the body unit 100. It is highly possible that dust adheres as the outer air circulates in the body unit 100 at the time a lens is exchanged with another. It is therefore advisable to remove dust when a lens is exchange with another. Then, it is determined that photography will be immediately performed, and the operation goes to Step S106.

If a specific accessory is not detected to have been attached to the body unit 100 (NO in Step S104), the Bucom 101 goes to the next step, i.e., Step S106.

In Step S106, the Bucom 101 detects the state of specific operation switch that the digital camera 10 has.

That is, the Bucom 101 determines whether the first release switch (not shown), which is a release switch, has been operated from the on/off state of the switch (Step S107). The Bucom 101 reads the state. If the first release switch has not been turned on for a predetermined time, the Bucom 101 discriminates the state of the power switch (Step S108). If the power switch is on, the Bucom 101 returns to Step S103. If the power switch is off, the Bucom 101 performs an end-operation (e.g., sleep).

On the other hand, the first release switch may be found to have been turned on in Step S107. In this case, the Bucom 101 acquires the luminance data about the object, from the photometry circuit 115, and calculates from this data an exposure time (Tv value) and a diaphragm value (Av value) that are optimal for the image acquisition unit 116 and lens unit 200, respectively (Step S109).

Thereafter, the Bucom 101 acquires the detection data from the AF sensor unit 109 through the AF sensor drive circuit 110, and calculates a defocus value from the detection data (Step S110). The Bucom 101 then determines whether the defocus value, thus calculated, fails within a preset tolerance range (Step S111). If the defocus value does not fall within the tolerance range, the Bucom 101 drives the photographic lens 202 (Step S112) and returns to Step S103.

On the other hand, the defocus value may falls within the tolerance range. In this case, the Bucom 101 calls the subroutine "silent vibration" and causes the dust filter 119 to vibrate silently (Step S113).

Further, the Bucom 101 determines whether the second release switch (not shown), which is another release switch, has been operated (Step S114). If the second release switch is on, the Bucom 101 goes to Step S115 and starts the prescribed photographic operation (later described in detail). If the second release switch is off, the Bucom 101 returns to Step S108.

During the image acquisition operation, the electronic image acquisition is controlled for a time that corresponds to the preset time for exposure (i.e., exposure time), as in ordinary photography.

As the above-mentioned photographic operation, Steps S115 to S121 are performed in a prescribed order to photograph an object. First, the Bucom 101 transmits the Av value to the Lucom 201, instructing the Lucom 201 to drive the diaphragm 203 (Step S115). Thereafter, the Bucom 101 moves the quick return mirror 105 to the up position (Step S116). Then, the Bucom 101 causes the front curtain of the shutter 108 to start running, performing open control (Step S117). Further, the Bucom 101 makes the image process controller 126 perform "image acquisition operation" (Step S118). When the exposure to the CCD 117 (i.e., photography) for the time corresponding to the Tv value ends, the Bucom 101 causes the rear curtain of the shutter 108 to start running, achieving CLOSE control (Step S119). Then, the Bucom 101 drives the quick return mirror 105 to the down position and cocks the shutter 108 (Step S120).

Then, the Bucom 101 instructs the Lucom 210 to move the diaphragm 203 back to the open position (Step S121). Thus, a sequence of image acquisition steps is terminated.

Next, the Bucom 101 determines whether the recording medium 127 is attached to the body unit 100 (Step S122). If the recording medium 127 is not attached, the Bucom 101 displays an alarm (Step S123). The Bucom 101 then returns to Step S103 and repeats a similar sequence of steps.

If the recording medium 127 is attached, the Bucom 101 instructs the image process controller 126 to record the image data acquired by photography, in the recording medium 127 (Step S124). When the image data is completely recorded, the Bucom 101 returns to Step S103 again and repeats a similar sequence of steps.

In regard to the detailed relation between the vibration state and the displaying state will be explained in detail, the sequence of controlling the "silent vibration" subroutine will be explained with reference to FIGS. 15 to 18. The term "vibration state" means the state of the vibration induced by the piezoelectric elements 120a and 120b, i.e., vibrating members. The subroutine of FIG. 15, i.e., "silent vibration," and the subroutine of FIGS. 16 to 18, i.e., "display process" are routines for accomplishing vibration exclusively for removing dust from the dust filter 119. Vibrational frequency $f_0$ is set to a value close to the resonance frequency of the dust filter 119. In the vibrational mode of FIG. 3A, for example, the vibrational frequency is 91 kHz, higher than at least 20 kHz, and produces sound not audible to the user.

As shown in FIG. 15, when the "silent vibration" is called, the Bucom 101 first reads the data representing the drive time (Toscf0) and drive frequency (resonance frequency: Noscf0) from the data stored in a specific area of the nonvolatile memory 128 (Step S201). At this timing, the Bucom 101 causes the display unit provided in the operation display LCD 129 or operation display LED 130 to turn on the vibrational mode display, as shown in FIG. 16 (Step S301). The Bucom 101 then determines whether a predetermined time has passed (Step S302). If the predetermined time has not passed, the Bucom 101 makes the display unit keep turning on the vibrational mode display. Upon lapse of the predetermined time, the Bucom 101 turns off the displaying of the vibrational mode display (Step S303).

Next, the Bucom 101 outputs the drive frequency Noscf0 from the output port D_NCnt to the N-scale counter 182 of the dust filter control circuit 121 (Step S202).

In the following steps S203 to S205, the dust is removed as will be described below. First, the Bucom 101 sets the output port. P_PwCont to High, thereby starting the dust removal (Step S203). At this timing, the Bucom 101 starts displaying the vibrating operation as shown in FIG. 17 (Step S311). The Bucom 101 then determines whether or not the predetermined time has passed (Step S312). If the predetermined time has not passed, the Bucom 101 keeps displaying the vibrating operation. Upon lapse of the predetermined time, the Bucom 101 stops displaying of the vibrating operation (Step S313). The display of the vibrating operation, at this time, changes as the time passes or as the dust is removed (how it changes is not shown, though). The predetermined time is almost equal to Toscf0, i.e., the time for which the vibration (later described) continues.

If the output port P_PwCont is set to High in Step S203, the piezoelectric elements 120a and 120b vibrate the dust filter 119 at the prescribed vibrational frequency (Noscf0), removing the dust 179 from the surface of the dust filter 119. At the same time the dust is removed from the surface of the dust filter 119, air is vibrated, producing an ultrasonic wave. The vibration at the drive frequency Noscf0, however, does not, make sound audible to most people. Hence, the user hears nothing. The Bucom 101 waits for the predetermined time Toscf0, while the dust filter 119 remains vibrated (Step S204). Upon lapse of the predetermined time Toscf0, the Bucom 101 sets the output port P_PwCont to Low, stopping the dust removal operation (Step S205). At this timing, as shown in FIG. 18, the Bucom 101 turns on the display unit, whereby the displaying of the vibration-end display is turned on (Step S321). When the Bucom 101 determines (in Step S322) that the predetermined time has passed, the displaying of the vibration-end display is turned off (Step S323). The Bucom 101 then returns to the step next to the step in which the "silent vibration" is called.

This subroutine keeps the dust filter 119 vibrated at a constant vibration ($f_o$=91 kHz) for a time (i.e., Toscf0) that is long enough to accomplish the dust removal.

That is, the vibrational mode adjusts the resonance frequency applied to the vibrating member, controlling the dust removal.

Second Embodiment

The subroutine "silent vibration" called in the camera sequence (main routine) that the Bucom performs in a digital camera that is a second embodiment of the image equipment according to this invention will be described with reference to FIG. 19. FIG. 19 illustrates a modification of the subroutine "silent vibration" shown in FIG. 15. The second embodiment differs from the first embodiment in the operating mode of the dust filter 119. In the first embodiment, the dust filter 119 is driven at a fixed frequency, i.e., frequency $f_o$, producing a standing wave. By contrast, in the second embodiment, the drive frequency is gradually changed, thereby achieving large-amplitude vibration at various frequencies including the resonance frequency, without strictly controlling the drive frequency.

If the aspect ratio shown in FIG. 6 has changed from the design value of 0.9, during the manufacture, the vibrational mode will greatly change (that is, the vibration speed ratio will abruptly change). Therefore, a precise resonance frequency must be set in each product and the piezoelectric elements 120a and 120b must be driven at the frequency so set. This is because the vibration speed will further decrease if the piezoelectric elements are driven at any frequency other than the resonance frequency. An extremely simple circuit configuration can, nonetheless, drive the piezoelectric elements precisely at the resonance frequency if the frequency is controlled as in the second embodiment. A method of control can therefore be achieved to eliminate any difference in resonance frequency between the products.

In the subroutine "silent vibration" of FIG. 19, the vibrational frequency $f_0$ is set to a value close to the resonance frequency of the dust filter 119. The vibrational frequency $f_0$ is 91 kHz in, for example, the vibrational mode of FIG. 3A. That is, the vibrational frequency exceeds at least 20 kHz, and makes sound not audible to the user.

First, the Bucom 101 reads the data representing the drive time (Toscf0), drive-start frequency (Noscfs), frequency change value ($\Delta f$) and drive-end frequency (Noscft), from the data stored in a specific area of the nonvolatile memory 128 (Step S211). At this timing, the Bucom 101 causes the display unit to display the vibrational mode as shown in FIG. 16, in the same way as in the first embodiment.

Next, the Bucom 101 sets the drive-start frequency (Noscfs) as drive frequency (Noscf) (Step S212). The Bucom 101 then outputs the drive frequency (Noscf) from the output port D_NCnt to the N-scale counter 182 of the dust filter control circuit 121 (Step S213).

In the following steps S214 et seq., the dust is removed as will be described below. First, the dust removed is started. At this time, the display of the vibrating operation is performed as shown in FIG. 17, as in the first embodiment.

First, the Bucom 101 sets the output port P_PwCont to High, to achieve dust removal (Step S214). The piezoelectric elements 120a and 120b vibrate the dust filter 119 at the prescribed vibrational frequency (Noscf), producing a standing wave of a small amplitude at the dust filter 119. The dust cannot be removed from the surface of the dust filter 119, because the vibrational amplitude is small. This vibration continues for the drive time (Toscf0) (Step S215). Upon lapse of this drive time (Toscf0), the Bucom 101 determines whether the drive frequency (Noscf) is equal to the drive-end frequency (Noscft) (Step S216). If the drive frequency is not equal to the drive-end frequency (NO in Step S216), the Bucom 101 adds the frequency change value ($\Delta f$) to the drive frequency (Noscf), and sets the sum to the drive frequency (Noscf) (Step S217). Then, the Bucom 101 repeats the sequence of Steps S212 to S216.

If the drive frequency (Noscf) is equal to the drive-end frequency (Noscft) (YES in Step S216), the Bucom 101 sets the output port P_PwCont to Low, stopping the vibration of the piezoelectric elements 120a and 120b (Step S218), thereby terminating the "silent vibration." At this point, the display of vibration-end is performed as shown in FIG. 18, as in the first embodiment.

As the frequency is gradually changed as described above, the amplitude of the standing wave increases. In view of this, the drive-start frequency (Ncoscfs), the frequency change value ($\Delta f$) and the drive-end frequency (Noscft) are set so that the resonance frequency of the standing wave may be surpassed. As a result, a standing wave of small vibrational amplitude is produced at the dust filter 119. The standing wave can thereby controlled, such that its vibrational amplitude gradually increases until it becomes resonance vibration, and then decreases thereafter. If the vibrational amplitude (corresponding to vibration speed) is larger than a prescribed value, the dust 179 can be removed. In other words, the dust 179 can be removed while the vibrational frequency remains in a prescribed range. This range is broad in the present embodiment, because the vibrational amplitude is large during the resonance.

If the difference between the drive-start frequency (Noscfs) and the drive-end frequency (Noscft) is large, the fluctuation of the resonance frequency, due to the temperature of the vibrator 170 or to the deviation in characteristic change of the vibrator 170, during the manufacture, can be absorbed. Hence, the dust 179 can be reliably removed from the dust filter 119, by using an extremely simple circuit configuration.

The present invention has been explained, describing some embodiments. Nonetheless, this invention is not limited to the embodiments described above. Various changes and modifications can, of course, be made within the scope and spirit of the invention.

For example, a mechanism that applies an air flow or a mechanism that has a wipe may be used in combination with the dust removal mechanism having the vibrating member, in order to remove the dust 179 from the dust filter 119.

In the embodiments described above, the vibrating members are piezoelectric elements. The piezoelectric elements may be replaced by electrostrictive members or super magnetostrictive elements. In the embodiments, two piezoelectric elements 120a and 120b are secured to the dust filter 119 that is dust-screening member. Instead, only one piezoelectric element may be secured to the dust filter 119. In this case, that side of the dust filter 119, to which the piezoelectric element is secured, differs in rigidity from the other side of the dust filter 119. Consequently, the node areas 173 where vibrational amplitude is small will form a pattern similar to that of FIG. 3A and FIG. 5, but will be dislocated. Thus, it is desirable to arrange two piezoelectric elements symmetrical to each other, because the vibration can be produced more efficiently and the dust filter 119 can be more easily held at four corners.

Figure 20:
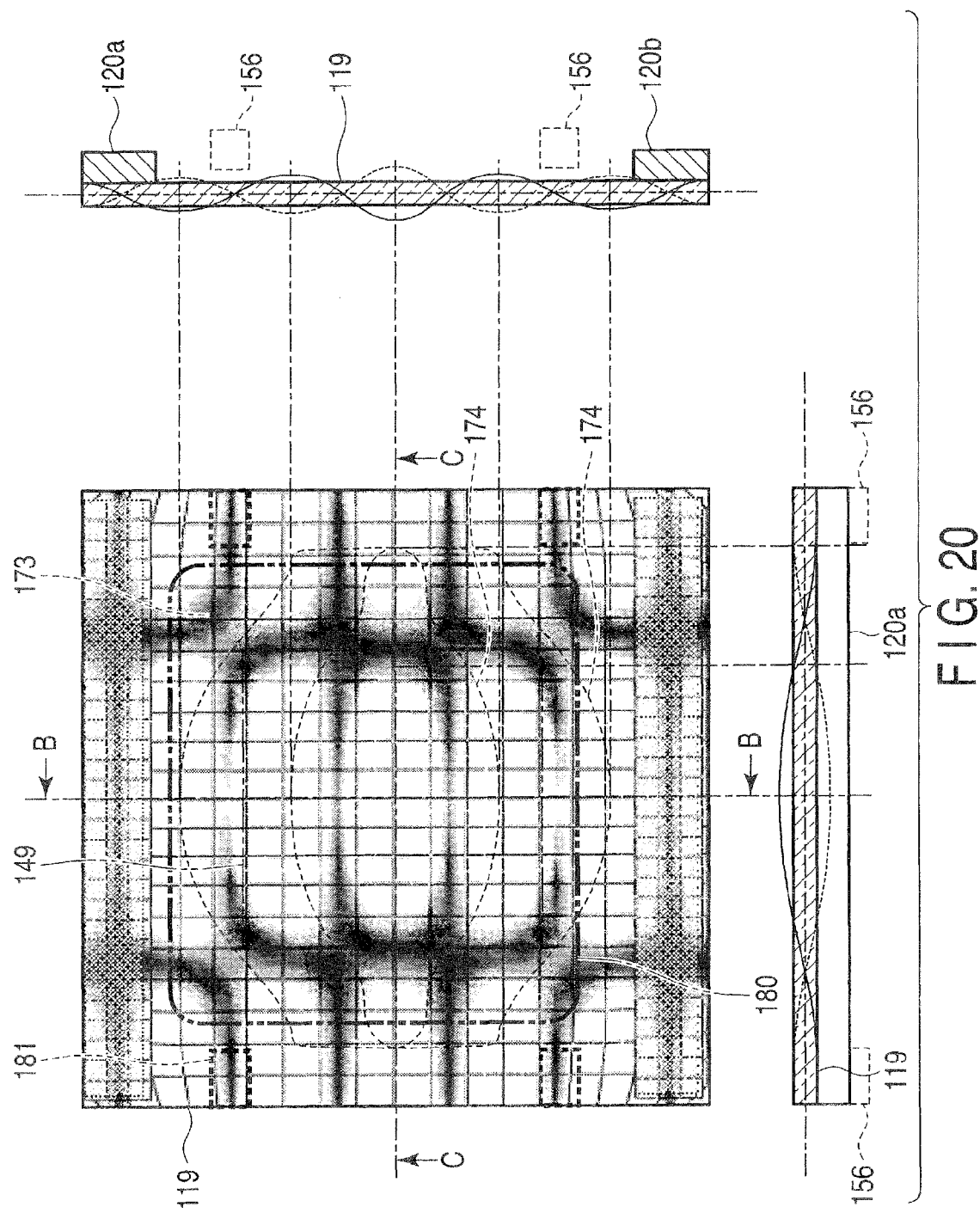
FIG. 20 is a diagram explaining how the dust filter is vibrated in still another mode.

As described above, the phase angle γ is +π/4 or ranges from −π/4 to −π/8. Nevertheless, the phase angle need not have such a precise value. If the phase angle γ differs a little from such value, the vibrational amplitude can be increased. Even in the vibrational mode of FIG. 20, in which the phase angle γ is a little smaller than +π/4, the peak ridges 174 of vibrational amplitude form closed loops around the optical axis, too, and the vibration speed decreases in the Z-direction at the center of the vibrator 170. This dust filter 119 is a glass plate (optical element) that has a size of 30.8 mm (X-direction: LA)×28.5 mm (Y-direction: LB)×0.65 mm (thickness). The dust filter 119 is rectangular, having long sides LA (30.8 mm, extending in the X-direction) and short sides LB (28.5 mm). Therefore, the dust filter 119 is identical to the "virtual rectangle" according to this invention, which has the same area as the dust filter 119. The piezoelectric elements 120a and 120b have a size of 30 mm (X-direction)×3 mm (Y-direction)×0.8 mm (thickness), having a length almost equal to the length LF (in the X-direction) of the dust filter 119, and are made of lead titanate-zirconate ceramic. The piezoelectric elements 120a and 120b are adhered with an epoxy-based adhesive to the dust filter 119, extending along the upper and lower sides of the filter 119, respectively, and positioned symmetric in the X-direction with respect to the centerline of the dust filter 119. In this case, the resonance frequency in the vibrational mode shown in FIG. 20 is in the vicinity of 68 kHz. The aspect ratio of the dust filter 119 is 0.925, and the length ratio about the piezoelectric elements is 0.974. This state is almost identical to the case where the length ratio about piezoelectric elements is 1.0. The node area 173 of the vibrational mode therefore assumes a shape similar to that of a net eye. The vibration speed ratio, which is about 0.7, is close to the limit of preserving the vibration speed at a level enough to remove the 179. As in FIGS. 2A and 2B, in this case, too, the dust filter 119 is supported by the lip part 150a of the seal 150, and the holder 145 has four cushion members 156 that support the dust filter 119 if an external force is applied to the seal 150.

In order to remove dust more efficiently from the member vibrated, the member may be coated with an indium-tin oxide (ITO) film, which is a transparent conductive film, indium-zinc film, poly 3,4-ethylenedioxy thiophene film, surfactant agent film that is a hygroscopic anti-electrostatic film, siloxane-based film, or the like. In this case, the frequency, the drive time, etc., all related to the vibration, are set to values that accord with the material of the film.

Moreover, the optical LPF 118, described as one embodiment of the invention, may be replaced by a plurality of optical LPFs that exhibit birefringence. Of these optical LPFs, the optical LPF located closest to the object of photography may be used as a dust-screening member (i.e., a subject to be vibrated), in place of the dust filter 119 shown in FIG. 2A.

Further, a camera may does not have the optical LPF 118 of FIG. 2A described as one embodiment of the invention, and the dust filter 119 may be used as an optical element such as an optical LPF, an infrared-beam filter, a deflection filter, or a half mirror.

Furthermore, the camera may not have the optical LPF 118, and the dust filter 119 may be replaced by the protection glass plate 142 shown in FIG. 2A. In this case, the protection glass plate 142 and the CCD chip 136 remain free of dust and moisture, and the structure of FIG. 2A that supports and yet vibrates the dust filter 119 may be used to support and vibrate the protection glass plate 142. Needless to say, the protection glass plate 142 may be used as an optical element such as an optical LPF, an infrared-beam filter, a deflection filter, or a half mirror.

The image equipment according to this invention is not limited to the image acquisition apparatus (digital camera) exemplified above. This invention can be applied to any other apparatus that needs a dust removal function. The invention can be practiced in the form of various modifications, if necessary. More specifically, a dust moving mechanism according to this invention may be arranged between the display element and the light source or image projecting lens in an image projector.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A vibrating device comprising:
   a dust-screening member shaped like a plate as a whole, having front and back surfaces and having a light-transmitting region for transmitting light between the front surface and the back surface;

a support member configured to support the dust-screening member, thereby to render the back surface of the dust-screening member airtight;

a vibrating member arranged at a circumference of the dust-screening member and shaped like a rectangle; and a vibration control unit configured to input an electrical signal to the vibrating member to generate, in the light-transmitting region, vibration forming a plurality of ridges of peaks defining a closed loop around a virtual intersection at which a virtual vibrational axis passing the half-length point of the vibrating member intersects with a virtual vibrational axis passing the half-length point of the dust-screening member, the vibration being one of vibration whose peak including the virtual intersection gradually increases in terms of amplitude as the amplitude of the peak approaches the virtual intersection, and becomes the largest in terms of amplitude at the virtual intersection, and vibration whose peak nearest the virtual intersection is the largest in terms of amplitude, wherein the dust-screening member and the vibrating member have the following relation:

$$1.2 \leq Ts/Tg \leq 1.6$$

where Tg is the thickness of the thickness of the dust-screening member, and Ts is the thickness of the vibrating member.

2. The device according to claim 1, wherein the dust-screening member is shaped, having at least one side parallel to the lengthwise direction of the vibrating member and being symmetric with respect with respect to a virtual symmetry axis passing the midpoint of the side and being perpendicular to the side.

3. The device according to claim 2, wherein the virtual axis in the dust-screening member is identical to the virtual axis of the vibrating member.

4. The device according to claim 1, wherein assuming that the dust-screening member is a virtual rectangle having the same area as on of the front and back surfaces, the dust-screening member so shaped that the ratio of either short side of the virtual rectangle to the either long side thereof is equal to or greater than 0.9, and less than 1.0.

5. The device according to claim 4, wherein the vibrating member is arranged at the long side of the virtual rectangle.

6. The device according to claim 1, further comprising an image sensor element arranged on the support member and opposed to the back surface of the dust-screening member.

7. The device according to claim 1, wherein the vibration control unit causes the vibrating member to produce vibration Z (x, y) at the dust-screening member, the vibration being expressed as follows:

$$Z(x,y) = W_{mn}(x,y) \cdot \cos(\gamma) + W_{nm}(x,y) \cdot \sin(\gamma)$$

where Z (x, y) is vibration at a given position (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$

$$W_{nm}(x, y) = \sin\left(m\pi \cdot x + \frac{\pi}{2}\right) \cdot \sin\left(n\pi \cdot y + \frac{\pi}{2}\right);$$

and $\gamma$ is $+\pi/4$ or ranges from $-\pi/8$ to $-\pi/4$.

8. The device according to claim 1, wherein the vibrating member have a piezoelectric element, and the vibration control unit supplies, to the piezoelectric element, a signal changing from a preset start frequency to a preset end frequency, by a specific transient frequency, for a prescribed time at each frequency value.

9. The device according to claim 1, wherein the dust-screening member is shaped like a rectangle defined as follows:

$$0.5 \leq Ls/LA \leq 1.0$$

where Ls is the length of the vibrating member arranged at the circumference of the dust-screening member, and LA is the length of the dust-screening member, as measured in the lengthwise direction of the vibrating member.

10. An image equipment comprising:

a dust-screening member shaped like a plate as a whole, having front and back surfaces and having a light-transmitting region for transmitting light between the front surface and the hack surface;

a support member configured to support the dust-screening member, thereby to render the back surface of the dust-screening member airtight;

a vibrating member arranged at a circumference of the dust-screening member and shaped like a rectangle;

an image sensor element having a photoelectric conversion unit configured to convert a light beam coming from an object of photograph through a photographic optical system, to an image signal, and being supported by the support member and rendered airtight at the back of the dust-screening member; and a vibration control unit configured to input an electrical signal to the vibrating member to generate, in the light-transmitting region, vibration forming a plurality of ridges of peaks defining a closed loop around a virtual intersection at which a virtual vibrational axis passing the half-length point of the vibrating member intersects with a virtual vibrational axis passing the half-length point of the dust-screening member, the vibration being one of vibration whose peak including the virtual intersection gradually increases in terms of amplitude as the amplitude of the peak approaches the virtual intersection, and becomes the largest in terms of amplitude at the virtual intersection, and vibration whose peak nearest the virtual intersection is the largest in terms of amplitude, wherein the dust-screening member and the vibrating member have the following relation:

$$1.2 \leq Ts/Tg \leq 1.6$$

where Tg is the thickness of the thickness of the dust-screening member, and Ts is the thickness of the vibrating member.

11. A vibrating device comprising:

a dust-screening member shaped like a plate as a whole, having front and back surfaces and having a light-transmitting region for transmitting light between the front surface and the back surface;

a support member configured to support the dust-screening member, thereby to render the back surface of the dust-screening member airtight;

a set of vibrating members arranged at a circumference of the dust-screening member and opposed to one another across the light-transmitting region of the dust-screening member and being shaped like a rectangle; and a vibration control unit configured to input an electrical signal to the vibrating members to generate, in the light-transmitting region, vibration forming a plurality of ridges of peaks defining a closed loop around a virtual intersection at which a virtual symmetry axis passing points at the same distance from the vibrating members intersects with virtual vibrational axes of the vibrating members, the vibration being vibration whose peak including the virtual intersection gradually increases in terms of amplitude as the amplitude of the peak approaches the virtual intersection, and becomes the largest in terms of amplitude at the virtual intersection, wherein the dust-screening member and the vibrating member have the following relation:

$$1.2 \leq Ts/Tg \leq 1.6$$

where Tg is the thickness of the thickness of the dust-screening member, and Ts is the thickness of the vibrating member.

* * * * *